US012427765B2

(12) United States Patent
Arakane

(10) Patent No.: US 12,427,765 B2
(45) Date of Patent: Sep. 30, 2025

(54) NON-TRANSITORY COMPUTER READABLE MEDIUM RECORDED WITH PROGRAM FOR CONTROLLING EXTERNAL APPARATUS CONFIGURED TO COMMUNICATE WITH LIQUID EJECTING APPARATUS

(71) Applicant: BROTHER KOGYO KABUSHIKI KAISHA, Nagoya (JP)

(72) Inventor: Satoru Arakane, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 196 days.

(21) Appl. No.: 18/180,956

(22) Filed: Mar. 9, 2023

(65) Prior Publication Data

US 2023/0302785 A1 Sep. 28, 2023

(30) Foreign Application Priority Data

Mar. 25, 2022 (JP) ................................ 2022-050367

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .. B41J 2/04586; B41J 2/0451; B41J 2/16579; B41J 2/16511; B41J 2/16517; B41J 2/04573; B41J 2/2142; B41J 2/165
See application file for complete search history.

(56) References Cited

U.S. PATENT DOCUMENTS 6,533,384 B1 * 3/2003 Vega .................... B41J 11/706 347/19
2007/0139461 A1 6/2007 Izuo
2014/0300657 A1 10/2014 Ike

FOREIGN PATENT DOCUMENTS

JP 2007-152889 A 6/2007
JP 2011-248565 A 12/2011
JP 2014-200982 A 10/2014

* cited by examiner

*Primary Examiner* — Jannelle M Lebron
(74) *Attorney, Agent, or Firm* — Merchant & Gould P.C.

(57) ABSTRACT

A non-transitory computer readable medium recorded with a program for controlling an external apparatus which has a memory and which is configured to communicate with a liquid ejecting apparatus is provided. The program allows a computer to acquire nozzle information from the liquid ejecting apparatus so that the nozzle information is stored in the memory. The program allows the computer to execute the nozzle information acquiring process at a first timing if the nozzle information, which is stored in the memory, fulfills a first condition, or the program allows the computer to execute the nozzle information acquiring process at a second timing having a frequency lower than that of the first timing if the nozzle information, which is stored in the memory, fulfills a second condition.

4 Claims, 14 Drawing Sheets

NON-TRANSITORY COMPUTER READABLE MEDIUM RECORDED WITH PROGRAM FOR CONTROLLING EXTERNAL APPARATUS CONFIGURED TO COMMUNICATE WITH LIQUID EJECTING APPARATUS

REFERENCE TO RELATED APPLICATIONS

This application claims priority from Japanese Patent Application No. 2022-050367 filed on Mar. 25, 2022. The entire content of the priority application is incorporated herein by reference.

BACKGROUND ART

A printer is known, which performs the recording by ejecting an ink from nozzles as an example of the liquid ejecting apparatus which ejects the liquid from the nozzles. Further, a recording system is known, which is formed by connecting the printer and a host computer so that the communication can be performed therebetween. The certain known printer is configured so that the nozzle check and the cleaning can be performed. In the case of the certain known recording system, if an application execution unit requests information relevant to the state of the nozzles of the printer, a printer driver execution unit generates a status request command which is transmitted to the printer. The printer, which receives the status request command, transmits, to the host computer, the status information which includes the result of the nozzle check after the cleaning executed immediately therebefore. The printer driver execution unit receives the status information transmitted from the printer to acquire the information relevant to the nozzle state included in the status information. The information is outputted to the application execution unit. In this case, the status information is the information which indicates whether or not any discharge failure is caused for each of the plurality of nozzles of the printing head.

DESCRIPTION

In this case, the printing head of the known printer has the large number of nozzles. On this account, the status information, which indicates whether or not the discharge failure is caused for each of the plurality of nozzles, has the data amount which is large to some extent. On this account, when the data amount is large, a lot of time is required to transmit the status information from the printer to the host computer. As a result, if the timing at which the recording is performed with the printer is overlapped with the timing at which the status information is transmitted, it is feared that the time is prolonged until the recording is completed after receiving the recording command for instructing the printer to perform the recording.

An object of the present disclosure is to provide a non-transitory computer readable medium recorded with a program which controls an external apparatus configured to communicate with a liquid ejecting apparatus and which can transmit, from the liquid ejecting apparatus, nozzle information to indicate states of nozzles, while maximally avoiding inhibition or interference of an action for ejecting a liquid onto an ejection objective medium in the liquid ejecting apparatus.

The program of the present disclosure resides in a program for controlling an external apparatus which has a memory and which is configured to communicate with a liquid ejecting apparatus including a head having a plurality of nozzles. The program allows a computer to execute: acquiring nozzle information to indicate states of the plurality of nozzles from the liquid ejecting apparatus so that the nozzle information is stored in the memory; acquiring the nozzle information at a first timing in a case that the nozzle information stored in the memory fulfills a first condition; and acquiring the nozzle information at a second timing having a frequency lower than that of the first timing in a case that the nozzle information stored in the memory fulfills a second condition being different from the first condition.

In another aspect, the program of the present disclosure resides in a program for controlling an external apparatus including a memory and which is configured to communicate with a liquid ejecting apparatus including a head having a plurality of nozzles. The program allows a computer to execute: generating ejection data to allow the liquid ejecting apparatus to eject a liquid from the plurality of nozzles to a medium; transmitting the ejection data generated to the liquid ejecting apparatus; acquiring nozzle information to indicate states of the plurality of nozzles from the liquid ejecting apparatus so that the nozzle information is stored in the memory; and judging whether the nozzle information stored in the memory fulfills a first condition or a second condition which is different from the first condition, before transmitting the ejection data generated and acquiring the nozzle information. Acquiring the nozzle information is executed before transmitting the ejection data generated in a case that it is judged that the nozzle information stored in the memory fulfills the first condition. Acquiring the nozzle information is executed after transmitting the ejection data generated in a case that it is judged that the nozzle information stored in the memory fulfills the second condition.

FIRST EMBODIMENT

A first embodiment of the present disclosure will be explained below.

<Overall Configuration of Printer>

Figure 1:
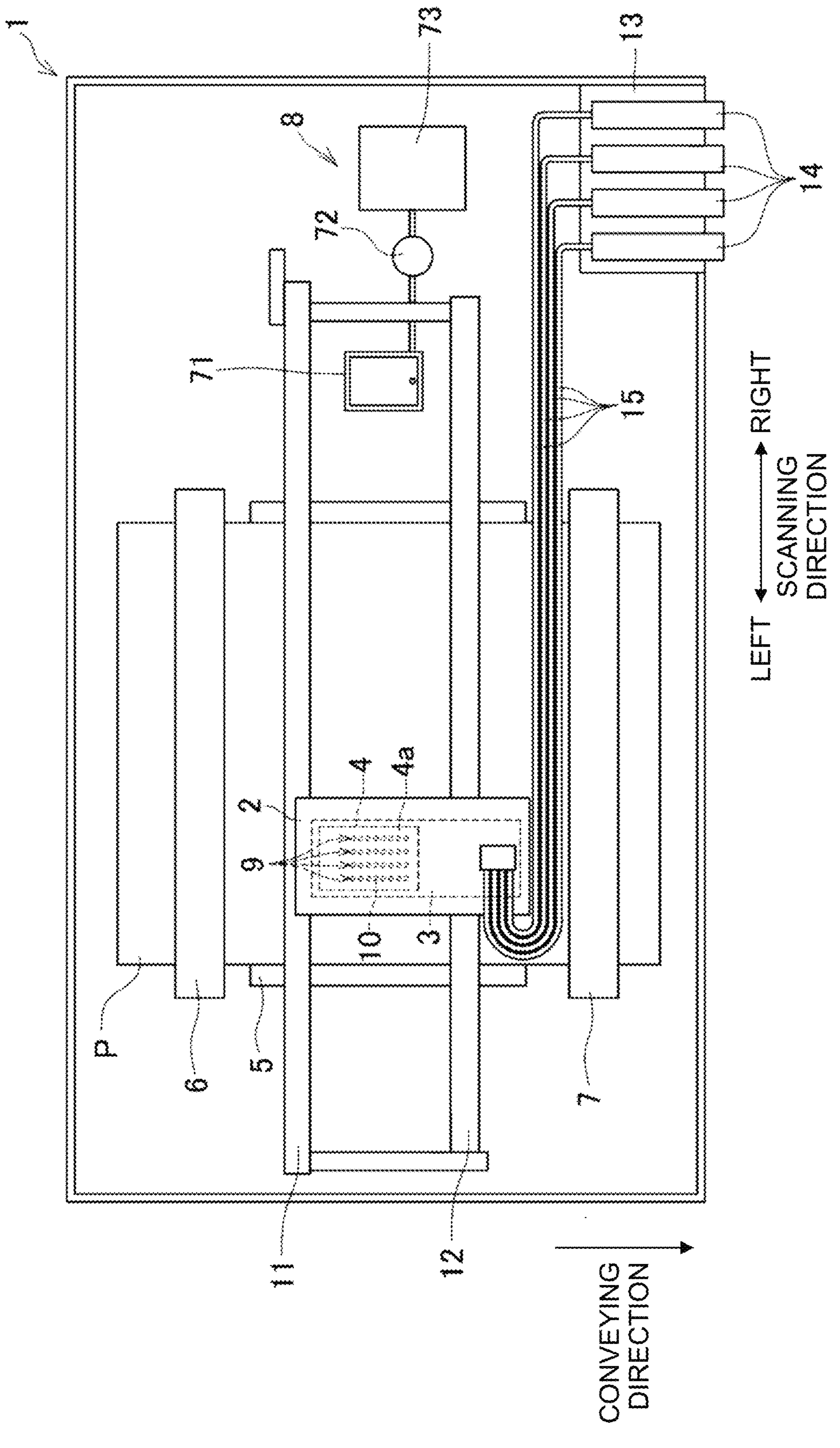
FIG. 1 is a schematic drawing illustrative of a printer.

As depicted in FIG. 1, a printer 1 according to a first embodiment ("liquid ejecting apparatus" of the present disclosure) is provided, for example, with a carriage 2, a subtank 3, an ink-jet head 4 ("head" of the present disclosure), a platen 5, conveying rollers 6, 7, and a maintenance unit 8 ("recovery mechanism" of the present disclosure).

The carriage 2 is supported by two guide rails 11, 12 which extend in the scanning direction. Note that in the following description, as depicted in FIG. 1, an explanation will be made while defining the right side and the left side in the scanning direction. The carriage 2 is connected to a carriage motor 86 (see FIG. 4) by the aid of, for example, an unillustrated belt. When the carriage motor 86 is driven, the carriage 2 is moved in the scanning direction along the guide rails 11, 12.

The subtank 3 is carried on the carriage 2. In this arrangement, the printer 1 is provided with a cartridge holder 13. Four ink cartridges 14 are removably installed to the cartridge holder 13. The four ink cartridges 14, which are installed to the cartridge holder 13, are aligned in the scanning direction. The four ink cartridges 14 store the inks of black, yellow, cyan, and magenta ("liquid" of the present disclosure) as referred to in this order starting from one positioned on the right side in the scanning direction.

The ink-jet head 4 is carried on the carriage 2, and the ink-jet head 4 is connected to the lower end portion of the subtank 3. The four color inks described above are supplied to the ink-jet head 4 from the subtank 3. Further, the ink-jet head 4 ejects the inks from a plurality of nozzles 10 formed on a nozzle surface 4*a* as the lower surface thereof. An explanation will be made in more detail below. The plurality of nozzles 10 is arranged in the conveying direction, and thus the plurality of nozzles 10 form nozzle arrays 9. The four nozzle arrays 9 are aligned in the scanning direction on the nozzle surface 4*a*. The inks of black, yellow, cyan, and magenta are ejected from the plurality of nozzles 10 as referred to in this order starting from those constructing the nozzle array 9 disposed on the right side in the scanning direction.

The platen 5 is arranged under or below the ink-jet head 4, and the platen 5 is opposed to the plurality of nozzles 10. The platen 5 extends over the entire length of the recording paper P in the scanning direction, and the platen 5 supports the recording paper P at the lower position. The conveying roller 6 is arranged on the upstream side in the conveying direction from the ink-jet head 4 and the platen 5. The conveying roller 7 is arranged on the downstream side in the conveying direction from the ink-jet head 4 and the platen 5. The conveying rollers 6, 7 are connected to a conveyance motor 87 (see FIG. 4), for example, via unillustrated gears. When the conveyance motor 87 is driven, then the conveying rollers 6, 7 are rotated, and the recording paper P is conveyed in the conveying direction.

The maintenance unit 8 is provided with a cap 71, a suction pump 72, and a waste liquid tank 73. The cap 71 is arranged on the right side in the scanning direction from the platen 5. When the carriage 2 is positioned at the maintenance position disposed on the right side in the scanning direction from the platen 5, the plurality of nozzles 10 is opposed to the cap 71.

Figure 4:
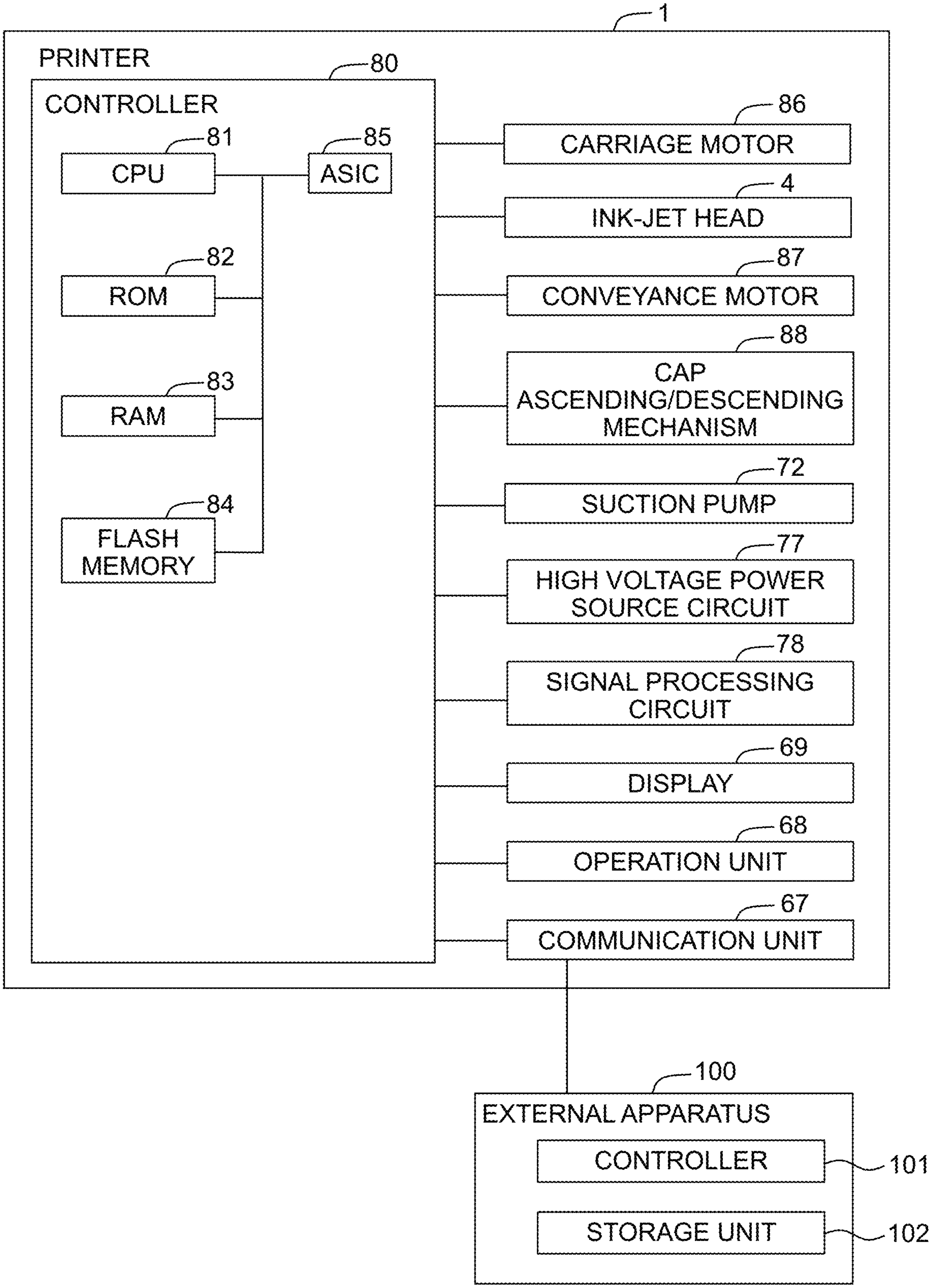
FIG. 4 is a block diagram illustrative of electric configuration of the printer.

Further, the cap 71 is connected to a cap ascending/descending mechanism 88 (see FIG. 4). When the cap ascending/descending mechanism 88 is driven, the cap 71 is moved upwardly/downwardly. When the cap 71 is moved upwardly by means of the cap ascending/descending mechanism 88 in a state in which the plurality of nozzles 10 is opposed to the cap 71 by positioning the carriage 2 at the maintenance position, the upper end portion of the cap 71 is brought in tight contact with the nozzle surface 4*a*. Accordingly, the capped state is given, in which the plurality of nozzles 10 of the ink-jet head 4 is covered with the cap 71. In a state in which the cap 71 is moved downwardly, the plurality of nozzles 10 is not covered with the cap 71. Note that the cap 71 is not limited to such configuration that the cap 71 covers the plurality of nozzles 10 by being brought in tight contact with the nozzle surface 4*a*. The cap 71 may cover the plurality of nozzles 10, for example, by being brought in tight contact with an unillustrated frame or the like arranged around the nozzle surface 4*a* of the ink-jet head 4.

The suction pump 72 is a tube pump or the like which is connected to the cap 71 and the waste liquid tank 73. Then, in the case of the maintenance unit 8, when the suction pump 72 is driven after providing the capped state as described above, it is possible to perform the suction purge ("recovery action" of the present disclosure) in which the inks contained in the ink-jet head 4 are discharged from the plurality of nozzles 10. The inks, which are discharged by the suction purge, are stored in the waste liquid tank 73.

Note that in this section, the explanation has been made for the purpose of convenience assuming that the cap 71 collectively covers all of the nozzles 10, and the inks contained in the ink-jet head 4 are discharged from all of the nozzles 10 in the suction purge. However, there is no limitation thereto. For example, the cap 71 may be distinctly provided with a portion which covers the plurality of nozzles 10 for constructing the nozzle array 9 disposed on the rightmost side for ejecting the black ink, and a portion which covers the plurality of nozzles 10 for constructing the three nozzle arrays 9 disposed on the left side for ejecting the color inks. Any one of the black ink and the color inks contained in the ink-jet head 4 can be selectively discharged in the suction purge. Alternatively, for example, the cap 71 may be provided individually for each of the nozzle arrays 9. The inks can be discharged from the nozzles 10 individually from each of the nozzle arrays 9 in the suction purge.

Figure 2:
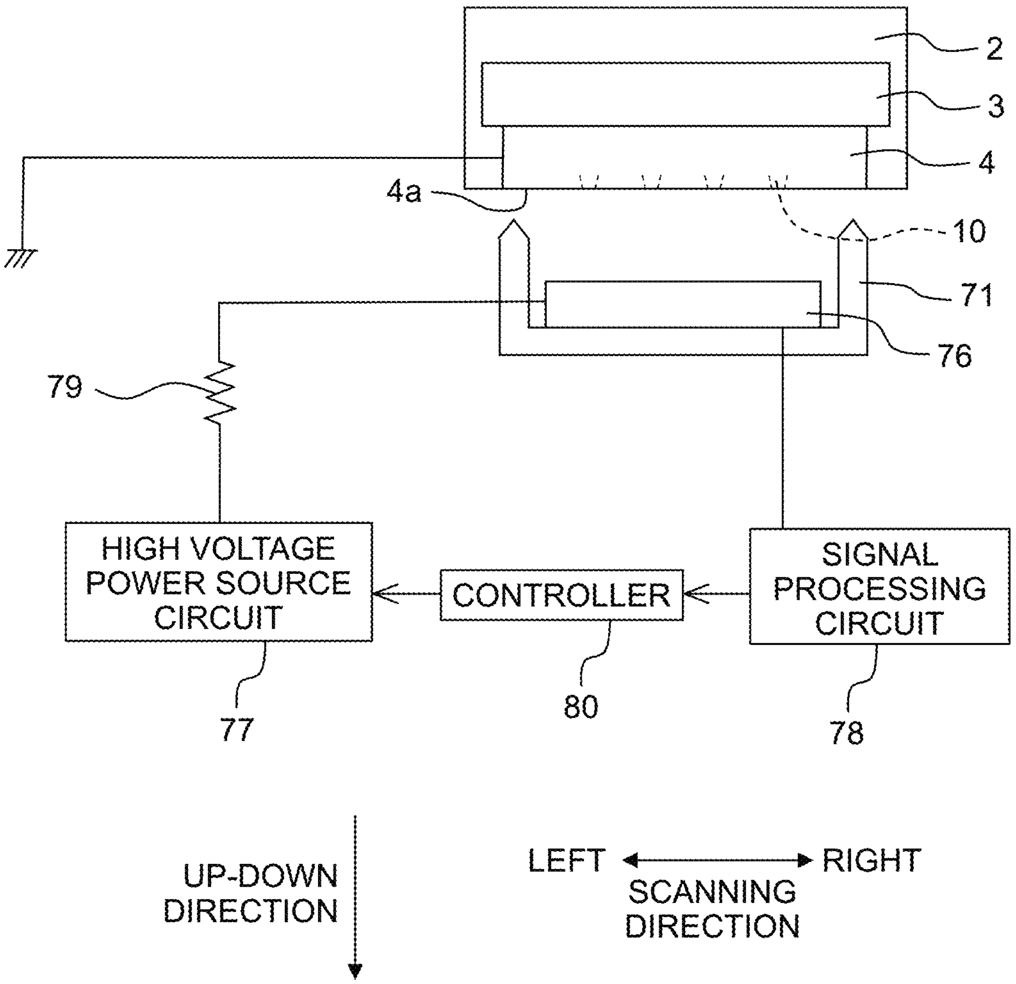
FIG. 2 is a drawing to explain an electrode arranged in a cap and a relationship of connection among the electrode, a high voltage power source circuit, and a signal processing circuit.

Further, as depicted in FIG. 2, each electrode 76, which has a rectangular planar shape, is arranged in the cap 71. The electrode 76 is connected to a high voltage power source circuit 77 via a resistor 79. Then, when the driving for inspection is performed as described later on, the high voltage power source circuit 77 applies a predetermined voltage (for example, about 600 V) to the electrode 76. On the other hand, the ink-jet head 4 is retained at the ground electric potential. Accordingly, a predetermined electric potential difference is generated between the ink-jet head 4 and the electrode 76. A signal processing circuit 78 is connected to the electrode 76. The signal processing circuit 78 includes, for example, a differentiating circuit, and the signal processing circuit 78 outputs a signal depending on the voltage of the electrode 76. However, the signal, which is outputted from the signal processing circuit 78, may be a current signal. Note that in the first embodiment, the combination of the electrode 76, the high voltage power source circuit 77, the signal processing circuit 78, and the resistor 79 corresponds to the "signal output unit" of the present disclosure.

In a state in which the voltage is applied to the electrode 76 by means of the high voltage power source circuit 77 after providing the capped state as described above and the driving for inspection described later on is not performed, the voltage of the signal outputted from the signal processing circuit 78 is the voltage V0 depicted in FIGS. 3A and 3B.

Further, in the first embodiment, in the state in which the voltage is applied to the electrode 76 by means of the high voltage power source circuit 77 after providing the capped state as described above, it is possible to perform the driving for inspection in order to allow the ink-jet head 4 to eject the inks from the nozzles 10 to the electrode 76.

When the ink is ejected from the nozzles 10 by means of the driving for inspection, the ink, which is ejected from the nozzles 10, is charged. Accordingly, the charged ink approaches the electrode 76, and the electric potential of the electrode 76 changes until the ink is landed on the electrode 76. Then, after the charged ink is landed on the electrode 76, the electric potential of the electrode 76 returns to the electric potential having been provided before the ejection of the ink, while being attenuated.

Figure 3A:
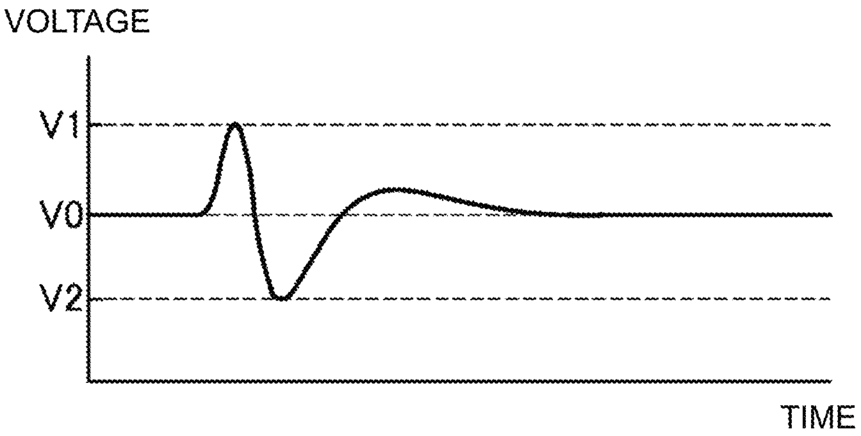
FIG. 3A is a drawing illustrative of a signal outputted from the signal processing circuit when the ink is ejected from the nozzle in accordance with the driving for inspection.

In this situation, the signal, which is outputted from the signal processing circuit 78, behaves as depicted in FIG. 3A such that the voltage is raised from the voltage V0 to the voltage V1 which is larger than the voltage V0. After that, the voltage is lowered to the voltage V2 which is smaller than the voltage V0. After that, the voltage is repeatedly raised and lowered while being attenuated, and the voltage returns to the voltage V0. Accordingly, the signal, which is outputted from the signal processing circuit 78, is the signal in which the maximum value is the voltage V1 and the minimum value is the voltage V2.

Figure 3B:
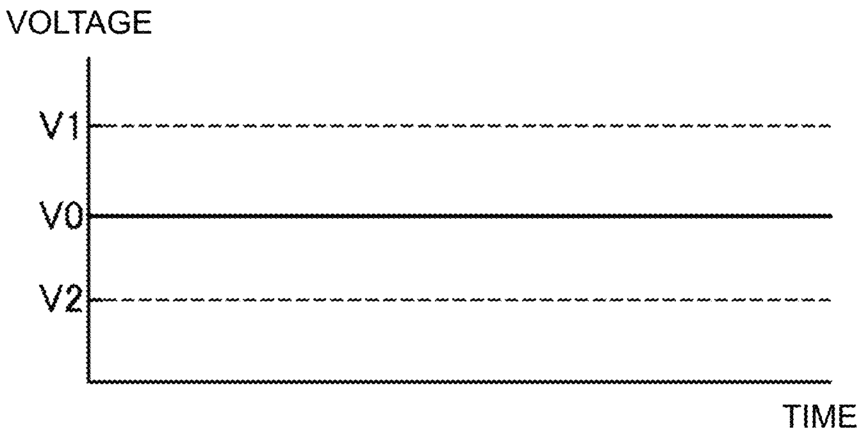
FIG. 3B is a drawing illustrative of a signal outputted from the signal processing circuit when the ink is not ejected from the nozzle in accordance with the driving for inspection.

On the other hand, when the ink is not ejected from the nozzle 10 by means of the driving for inspection, the signal, which is outputted from the signal processing circuit 78, behaves as depicted in FIG. 3B such that the voltage scarcely changes from the voltage V0.

In this way, in the first embodiment, the signal, which is outputted from the signal processing circuit 78, differs depending on whether or not the ink is ejected from the nozzles 10 by means of the driving for inspection. Then, in the first embodiment, this fact is utilized to judge whether or not the ink is ejected normally from the nozzles 10 as described later on.

In this section, the first embodiment has been configured such that the predetermined voltage is applied to the electrode 76, the ink-jet head 4 is retained at the ground electric potential, and the signal processing circuit 78 outputs the signal depending on the voltage of the electrode 76. However, there is no limitation thereto. The following configuration is also available. That is, the electrode 76 is retained at the ground electric potential, and the electric potential difference is generated between the electrode 76 and the ink-jet head 4 by applying the predetermined voltage to the ink-jet head 4. The signal processing circuit 78 is connected to the ink-jet head 4 to output the signal depending on the voltage of the ink-jet head 4.

<Electric Configuration of Printer>

Next, the electric configuration of the printer 1 will be explained. As depicted in FIG. 4, the printer 1 is provided with a controller 80. The controller 80 is composed of, for example, CPU (Central Processing Unit) 81, ROM (Read Only Memory) 82, RAM (Random Access Memory) 83, a flash memory 84 ("memory" of the present disclosure), and ASIC (Application Specific Integrated Circuit) 85. The controller 80 controls the actions or operations of, for example, the carriage motor 86, the ink-jet head 4, the conveyance motor 87, the cap ascending/descending mechanism 88, the suction pump 72, and the high voltage power source circuit 77. Further, the controller 80 receives the signal, for example, from the signal processing circuit 78.

Further, in addition to the constitutive components described above, the printer 1 is provided with a display 69, an operation unit 68, and a communication unit 67. The display 69 is, for example, a liquid crystal display which is provided on the casing of the printer 1. The controller 80 controls the display 69 to display, on the display 69, the information which is required, for example, for the action of the printer 1. The operation unit 68 includes, for example, a button which is provided on the casing of the printer 1 and a touch panel which is provided for the display 69. The operation unit 68 receives the signal based on the operation of the user, and the received signal is transmitted to the controller 80.

The communication unit 67 is connected so that the communication can be made with an external apparatus 100. The communication unit 67 may be communicated with the external apparatus 100 by being connected to the external apparatus 100 in a wired manner, or the communication unit 67 may be communicated with the external apparatus 100 by being connected to the external apparatus 100 in a wireless manner.

The external apparatus 100 is, for example, PC, a smartphone or the like. The external apparatus 100 has a controller 101 and a memory 102. The controller 101 of the external apparatus 100 is composed of, for example, CPU, ROM, and RAM. The memory 102 of the external apparatus 100 is, for example, a flash memory. Further, the memory 102 stores the nozzle information which relates to whether or not each of the plurality of nozzles 10 of the ink-jet head 4 is the abnormal nozzle. In this case, it is recognized whether or not the abnormal nozzle is present in the plurality of nozzles 10 of the ink-jet head 4 according to the information about whether or not each of the plurality of nozzles 10 of the ink-jet head 4 is the abnormal nozzle. That is, in the first embodiment, the nozzle information includes the information which relates to whether or not the abnormal nozzle is present in the plurality of nozzles 10 of the ink-jet head 4.

Note that as for the controller 80, only CPU 81 may perform various processings, only ASIC 85 may perform various processings, or CPU 81 and ASIC 85 may perform various processings in a cooperating manner. Further, as for the controller 80, one CPU 81 may perform the processing singly, or a plurality of CPUs 81 may perform the processing in a shared manner. Further, as for the controller 80, one ASIC 85 may perform the processing singly, or a plurality of ASICs 85 may perform the processing in a shared manner.

<Process Performed by Controller of Printer>

Next, an explanation will be made about the process performed by the controller 80 of the printer 1. In the first embodiment, the controller 80 of the printer 1 performs the process in accordance with the flow depicted in FIG. 5A during the period in which the electric power is supplied to the printer 1, for example, in such a situation that the plug of the printer 1 is connected to a commercial power source.

The flow depicted in FIG. 5A will be explained in detail below. The controller 80 of the printer 1 waits until the recording data for performing the recording on the recording paper P is received from the external apparatus 100, a predetermined inspection start condition is fulfilled, or the nozzle information request signal for requesting the nozzle information is received from the external apparatus 100 (S101: NO, S102: NO, S103: NO).

The inspection start condition includes, for example, a condition in which a predetermined time arrives, a condition in which the number of sheets of the recording paper P subjected to the recording after the previous inspection process arrives at a predetermined number of sheets, and a condition in which any error occurs, for example, such that that the printer 1 is clogged with the recording paper P. When the inspection start condition resides in one condition, it is judged in the process of S102 that the inspection start condition is fulfilled if the one condition is fulfilled. When the inspection start condition includes a plurality of conditions, it is judged in the process of S102 that the inspection start condition is fulfilled if at least one condition of these conditions is fulfilled.

If the recording data is received (S101: YES), then the controller 80 of the printer 1 executes the recording process (S104), and the routine returns to the process of S101. In the recording process, the controller 80 of the printer 1 repeatedly performs the recording pass in which the ink-jet head 4 is allowed to eject the inks from the plurality of nozzles 10 toward the recording paper P while moving the carriage 2 in the scanning direction by controlling the carriage motor 86, and the conveyance action in which the conveying rollers 6, 7 are allowed to convey the recording paper P by a predetermined distance by controlling the conveyance motor 87. In this procedure, the controller 80 of the printer 1 allows the respective nozzles 10 to eject the inks therefrom at the timings based on the recording data in the recording pass, and the controller 80 of the printer 1 conveys the recording paper P by the conveyance amount based on the recording data in the conveyance action.

If the inspection start condition is fulfilled (S102: YES), then the controller 80 of the printer 1 executes the inspection process (S105), and the routine returns to the process of S101. In the inspection process, the controller 80 of the printer 1 provides the capped state as described above, and the controller 80 of the printer 1 allows the ink-jet head 4 to perform the driving for inspection for each of the plurality of nozzles 10 in a state in which the high voltage power source circuit 77 is allowed to apply the voltage to the electrode 76. Then, the nozzle information is acquired on the basis of the signal outputted from the signal processing circuit 78 when the driving for inspection is performed for each of the nozzles 10, and the nozzle information is stored in the flash memory 84.

If the nozzle information request signal is received (S103: YES), then the controller 80 of the printer 1 transmits, to the external apparatus 100, the nozzle information stored in the flash memory 84 in the inspection process of S105 (S106), and the routine returns to the process of S101. In this procedure, the inspection start condition described above may include such a condition that the nozzle information request signal is received. In this case, if the nozzle information request signal is received, the controller 80 of the printer 1 transmits the nozzle information in S106 after executing the inspection process in S105.

<Process Performed by Controller of External Apparatus>

Next, an explanation will be made about the process performed by the controller 101 of the external apparatus 100. The controller 101 of the external apparatus 100 performs the process in accordance with the flow depicted in FIG. 5B during the period in which the electric power is supplied to the external apparatus 100. For example, when the external apparatus 100 is PC, the electric power is supplied to the external apparatus 100 by connecting the plug of PC to the commercial power source. In another situation, when the external apparatus 100 has a battery, for example, if the external apparatus 100 is a note-type PC or a smartphone, then the electric power is supplied from the battery to the external apparatus 100. Note that the program, which is provided to allow the controller 101 of the external apparatus 100 to perform the process, including, for example, the program for allowing the controller 101 of the external apparatus 100 to perform the process in accordance with the flow depicted in FIG. 5B, corresponds to the "program" of the present disclosure.

The flow depicted in FIG. 5B will be explained in detail below. The controller 101 of the external apparatus 100 judges whether or not the nozzle information, which is stored in the memory 102, indicates that the abnormal nozzle is present in the plurality of nozzles 10 of the ink-jet head 4 (S201, "judging process" of the present disclosure).

Note that in the first embodiment, the condition, in which the nozzle information indicates that the abnormal nozzle is present in the plurality of nozzles 10 of the ink-jet head 4, corresponds to the "first condition" of the present disclosure. Further, in the first embodiment, the condition, in which the nozzle information indicates that the abnormal nozzle is absent in the plurality of nozzles 10 of the ink-jet head 4, corresponds to the "second condition" of the present disclosure.

If the nozzle information indicates that the abnormal nozzle is present (S201: YES), the controller 101 of the external apparatus 100 judges whether or not the elapsed time T, which elapsed after receiving the nozzle information from the printer 1 last time, is not less than the first time T1 (S202). If the elapsed time T is less than the first time T1 (S202: NO), the routine returns to the process of S201. If the elapsed time T is not less than the first time T1 (S202: YES), the routine advances to the process of S204.

If the nozzle information indicates that the abnormal nozzle is absent (S201: NO), the controller 101 of the external apparatus 100 judges whether or not the elapsed time T is not less than the second time T2 (S203). The second time T2 is the time longer than the first time T1. If the elapsed time T is less than the second time T2 (S203: NO), the routine returns to S201. If the elapsed time T is not less than the second time T2 (S203: YES), the routine advances to the process of S204.

In the process of S204, the controller 101 of the external apparatus 100 transmits the nozzle information request signal to the printer 1. After that, the controller 101 of the external apparatus 100 waits until the nozzle information is received from the printer 1 (S205: NO). If the nozzle information is received from the printer 1 (S205: YES), then the nozzle information, which is stored in the memory 102, is updated to the received nozzle information (S206), the elapsed time T is reset to zero (S207), and the routine returns to the process of S201. Note that in the first embodiment, the processes of S204 to S206, in which the nozzle information request signal is transmitted to the printer 1 to receive the nozzle information from the printer 1, and the nozzle information stored in the memory 102 is updated, correspond to the "nozzle information acquiring process" of the present disclosure.

Accordingly, in the first embodiment, if the nozzle information indicates that the abnormal nozzle is present in the plurality of nozzles 10 of the ink-jet head 4, the nozzle information is acquired from the printer 1 at the first timing at which the elapsed time T is the first time T1. Further, if the nozzle information indicates that the abnormal nozzle is absent in the plurality of nozzles 10 of the ink-jet head 4, the nozzle information is acquired from the printer 1 at the second timing at which the elapsed time T is the second time T2, the second timing having the frequency lower than that of the first timing.

Technical Effect of First Embodiment

In the first embodiment, the necessity for the external apparatus 100 to acquire the nozzle information from the printer 1 is low when the abnormal nozzle is absent as compared with when the abnormal nozzle is present. In view of the above, in the first embodiment, the first condition is such a condition that the nozzle information, which is stored in the memory 102 of the external apparatus 100, indicates that the abnormal nozzle is present. Further, the second condition is such a condition that the nozzle information, which is stored in the memory 102 of the external apparatus 100, indicates that the abnormal nozzle is absent. Then, the frequency to acquire the nozzle information is lowered when the second information is fulfilled as compared with when the first condition is fulfilled. Accordingly, it is possible to allow the external apparatus 100 to acquire the nozzle information from the printer 1 at the frequency corresponding to the necessity. As a result, it is possible to maximally lower the frequency at which the timing for the external apparatus 100 to acquire the nozzle information from the printer 1 is overlapped with the timing for the printer 1 to perform the recording on the recording paper P.

Second Embodiment

Next, a second embodiment of the present disclosure will be explained. The second embodiment also relates to the printer 1 and the external apparatus 100 in the same manner as the first embodiment. Also in the second embodiment, the controller 80 of the printer 1 performs the process in accordance with the flow depicted in FIG. 5A. On the other hand, in the second embodiment, the controller 101 of the external apparatus 100 performs the process in accordance with the flow depicted in FIG. 6A. In the flow depicted in FIG. 6A, the process of S201 of the flow depicted in FIG. 5B is replaced with the process of S301.

In S301, the controller 101 of the external apparatus 100 judges whether or not the number N of the abnormal nozzles of the plurality of nozzles 10 of the ink-jet head 4 is not less than a predetermined number N1 in relation to the nozzle information stored in the memory 102 ("judging process" of the present disclosure).

In this procedure, also in the second embodiment, the nozzle information, which is stored in the memory 102, is the information to indicate whether or not each of the plurality of nozzles 10 of the ink-jet head 4 is the abnormal nozzle. Then, if it is recognized whether or not each of the plurality of nozzles 10 of the ink-jet head 4 is the abnormal nozzle, it is possible to recognize the number of the abnormal nozzles of the plurality of nozzles 10 of the ink-jet head 4. That is, in the second embodiment, the nozzle information includes the information which relates to the number of the abnormal nozzles of the plurality of nozzles 10 of the ink-jet head 4.

Note that in the second embodiment, the condition, in which the nozzle information stored in the memory 102 indicates that the number N of the abnormal nozzles of the plurality of nozzles 10 of the ink-jet head 4 is not less than the predetermined number N1, corresponds to the "first condition" of the present disclosure. Further, in the second embodiment, the condition, in which the nozzle information stored in the memory 102 indicates that the number N of the abnormal nozzles of the plurality of nozzles 10 of the ink-jet head 4 is less than the predetermined number N1, corresponds to the "second condition" of the present disclosure.

Then, in the second embodiment, if the nozzle information stored in the memory 102 indicates that the number N of the abnormal nozzles of the plurality of nozzles 10 of the ink-jet head 4 is not less than the predetermined number N1 (S301: YES), the routine advances to the process of S202. Further, if the nozzle information stored in the memory 102 indicates that the number N of the abnormal nozzles of the plurality of nozzles 10 of the ink-jet head 4 is less than the predetermined number N1 (S301: NO), the routine advances to the process of S203.

Technical Effect of Second Embodiment

In the second embodiment, the necessity for the external apparatus 100 to acquire the nozzle information from the printer 1 is low when the number of the abnormal nozzles is small as compared with when the number of the abnormal nozzles is large. In view of the above, in the second embodiment, the first condition is such a condition that the nozzle information, which is stored in the memory 102 of the external apparatus 100, indicates that the number N of the abnormal nozzles is not less than the predetermined number N1. Further, the second condition is such a condition that the nozzle information, which is stored in the memory 102 of the external apparatus 100, indicates that the number N of the abnormal nozzles is less than the predetermined number N1. Then, the frequency to acquire the nozzle information is lowered when the second condition is fulfilled as compared with when the first condition is fulfilled. Accordingly, it is possible to allow the external apparatus 100 to acquire the nozzle information from the printer 1 at the frequency corresponding to the necessity. As a result, it is possible to maximally lower the frequency at which the timing for the external apparatus 100 to acquire the nozzle information from the printer 1 is overlapped with the timing for the printer 1 to perform the recording on the recording paper P.

Third Embodiment

Next, a third embodiment of the present disclosure will be explained. The third embodiment also relates to the printer 1 and the external apparatus 100 in the same manner as the first and second embodiments. However, in the third embodiment, the nozzle information includes the information which relates to whether or not each of the nozzles of the plurality of nozzles 10 of the ink-jet head 4 is the abnormal nozzle, and the information which relates to whether or not each of the nozzles of the plurality of nozzles 10 of the ink-jet head 4 is the unrecoverable nozzle. The unrecoverable nozzle is the abnormal nozzle which cannot be recovered by the suction purge.

In this procedure, it is possible to recognize the number of the abnormal nozzles and the number of the unrecoverable nozzles of the plurality of nozzles 10 of the ink-jet head 4 according to the information to indicate each of the nozzles of the plurality of nozzles 10 of the ink-jet head 4 is the abnormal nozzle and the information to indicate each of the nozzles of the plurality of nozzles 10 of the ink-jet head 4 is the unrecoverable nozzle. That is, in the third embodiment, the nozzle information includes the information which relates to the number of the abnormal nozzles and the information which relates to the number of the unrecoverable nozzles in relation to the plurality of nozzles 10 of the ink-jet head 4.

Figure 5A:
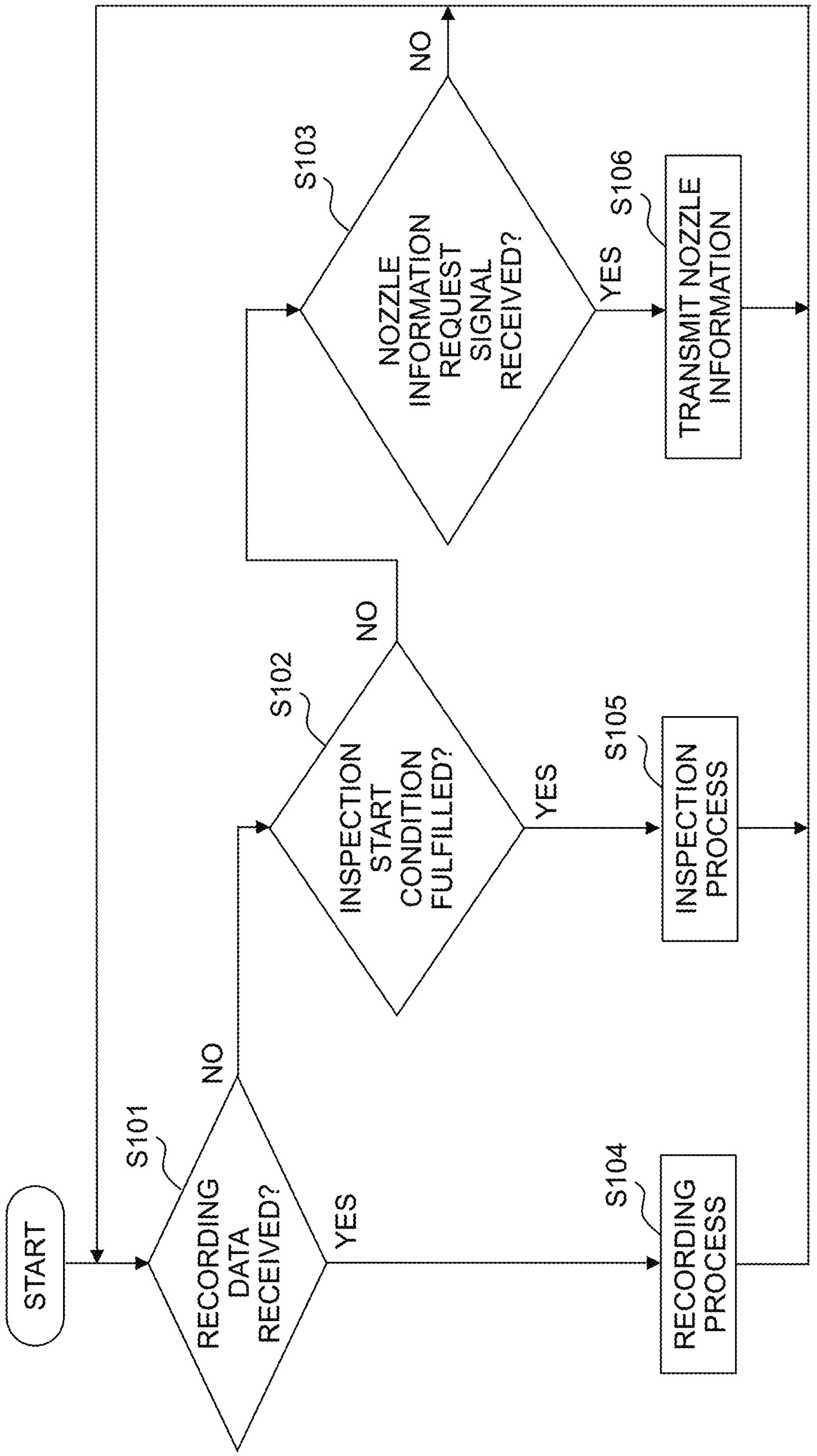
FIG. 5A is a flow chart illustrative of a flow of the process in the printer when the electric power is supplied to the printer.
Figure 5B:
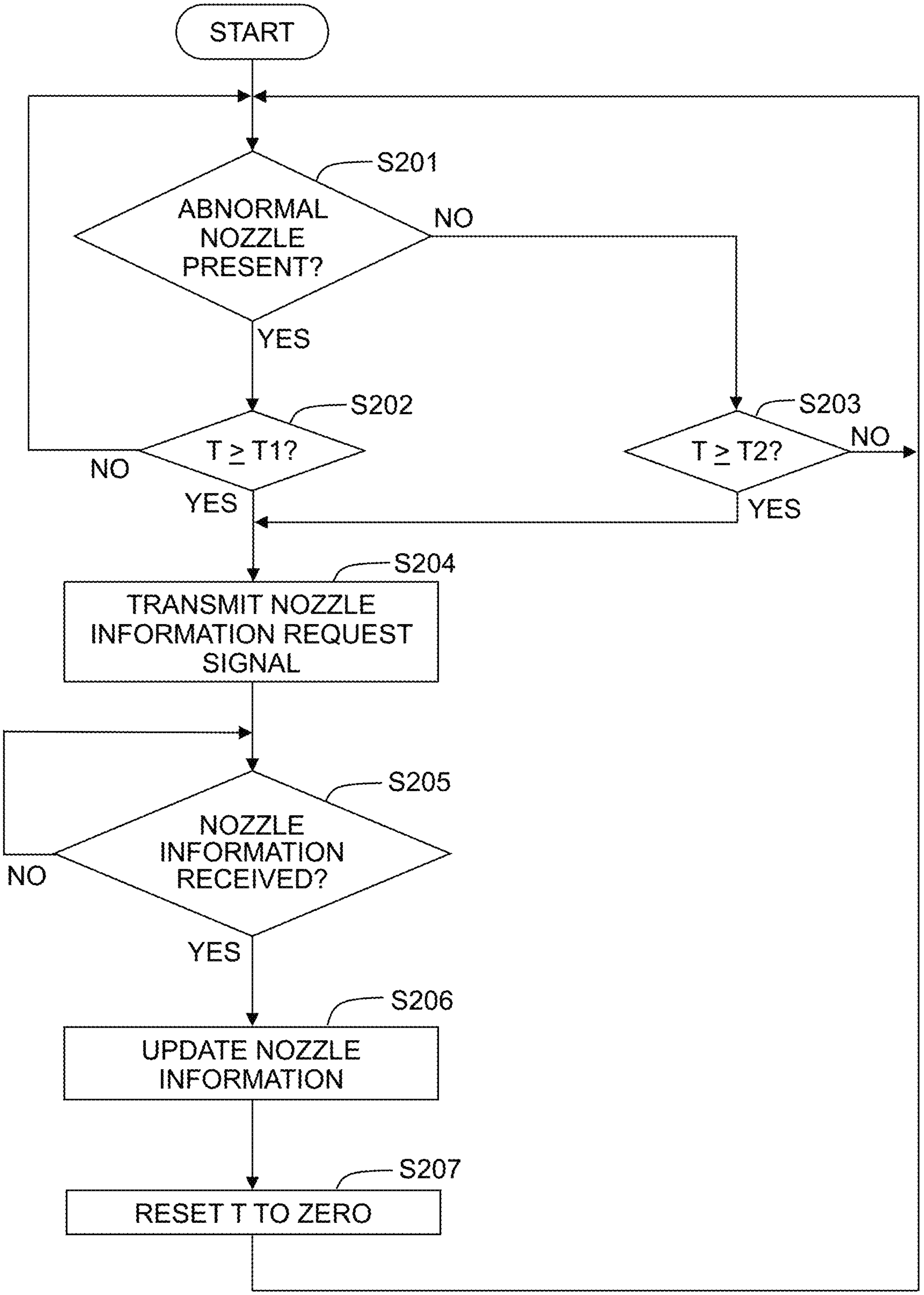
FIG. 5B is a flow chart illustrative of a flow of the process in an external apparatus when the electric power is supplied to the external apparatus.
Figure 6A:
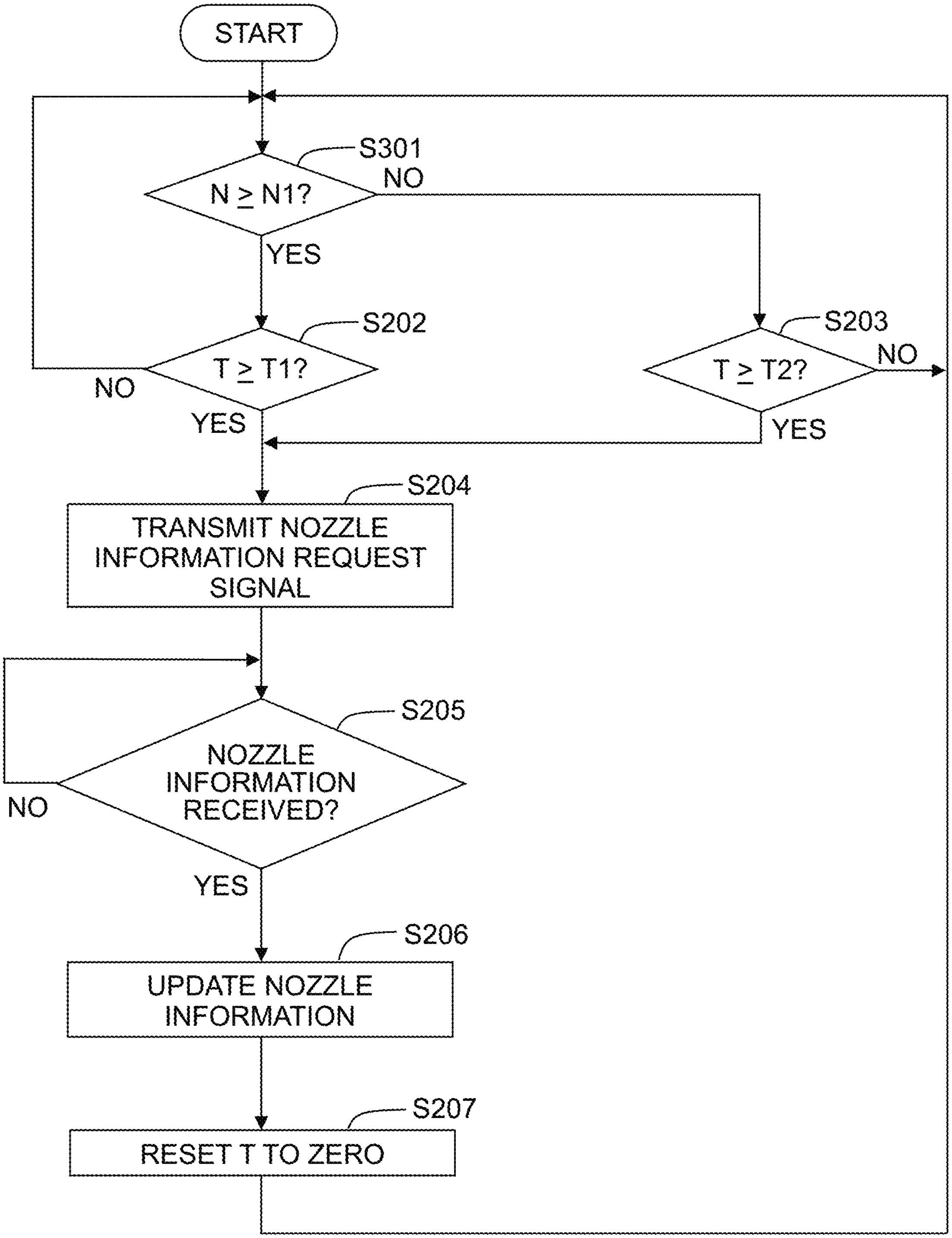
FIG. 6A is a flow chart illustrative of a flow of the process in an external apparatus when the electric power is supplied to the external apparatus.

Also in the third embodiment, the controller 80 of the printer 1 performs the process in accordance with the flow depicted in FIG. 5A. However, in the third embodiment, in the inspection process of S105, the controller 80 of the printer 1 allows the flash memory 84 to store the information to indicate whether or not each of the plurality of nozzles 10 of the ink-jet head 4 is the abnormal nozzle and the information to indicate whether or not each of the plurality of nozzles 10 of the ink-jet head 4 is the unrecoverable nozzle. For example, the controller 80 of the printer 1 operates as follows. That is, the nozzle 10, which is included in the nozzles 10 judged to be the abnormal nozzles and which is regarded as the abnormal nozzle in each of the continuous inspection processes of not less than a predetermined number including the inspection process performed this time, is regarded as the unrecoverable nozzle. The nozzle information is stored in the flash memory 84.

Figure 6B:
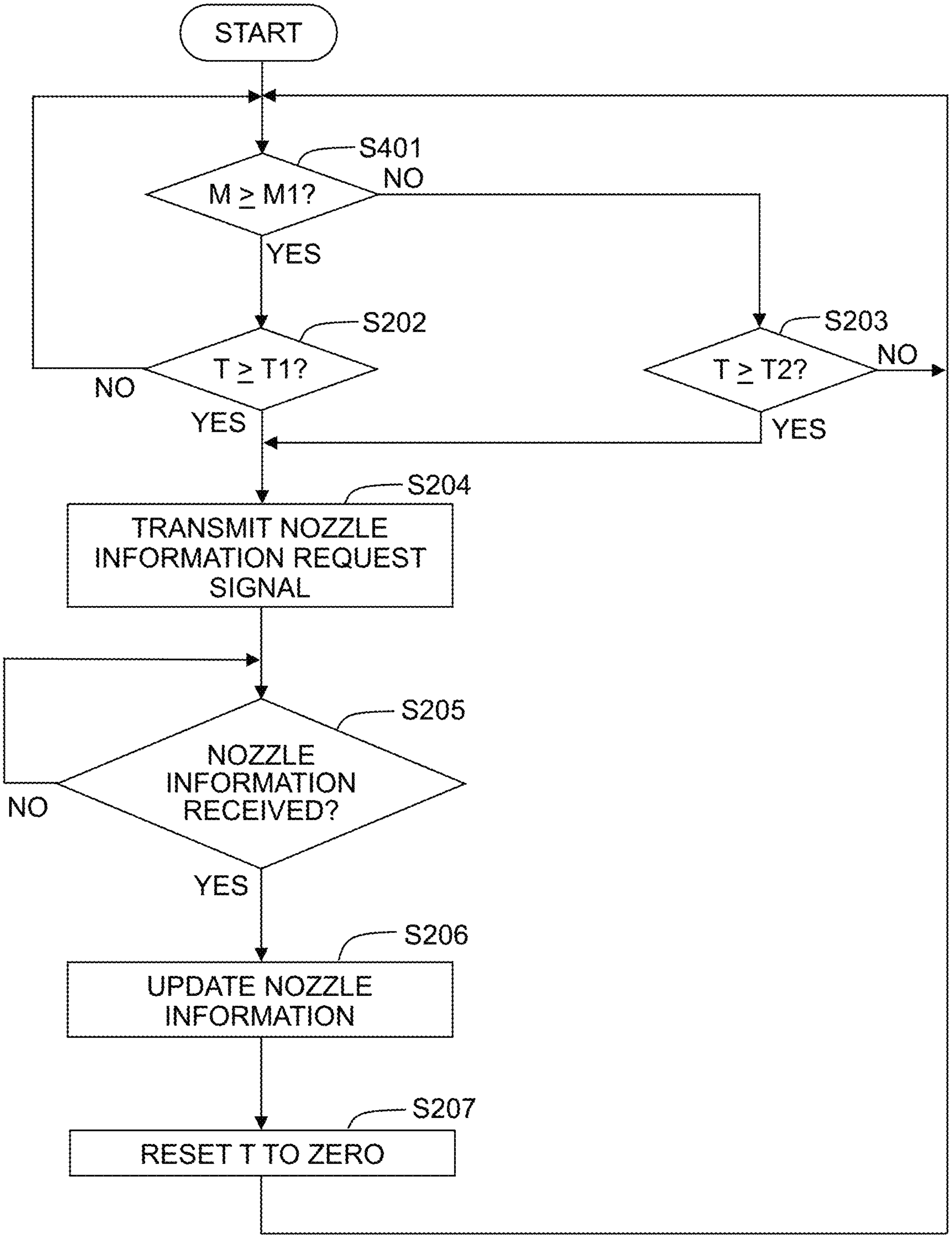
FIG. 6B is a flow chart illustrative of a flow of the process in an external apparatus when the electric power is supplied to the external apparatus.

Further, in the third embodiment, the flow of the process performed by the controller 101 of the external apparatus 100 is different from those of the first and second embodiments. In the third embodiment, the controller 101 of the external apparatus 100 performs the process in accordance with the flow depicted in FIG. 6B. In the flow depicted in FIG. 6B, the process of S201 in the flow depicted in FIG. 5B is replaced with the process of S401.

In the process of S401, the controller 101 of the external apparatus 100 judges whether or not the nozzle information stored in the memory 102 indicates that the number M of the recoverable nozzles of the plurality of nozzles 10 of the ink-jet head 4 is not less than a predetermined number M ("judging process" of the present disclosure). The number M of the recoverable nozzles is the number obtained by subtracting the number of the unrecoverable nozzles from the number of the abnormal nozzles. Note that in the third embodiment, the condition, in which the nozzle information stored in the memory 102 indicates that the number M of the recoverable nozzles of the plurality of nozzles 10 of the ink-jet head 4 is not less than the predetermined number M1, corresponds to the "first condition" of the present disclosure. Further, in the third embodiment, the condition, in which the nozzle information stored in the memory 102 indicates that the number M of the recoverable nozzles of the plurality of nozzles 10 of the ink-jet head 4 is less than the predetermined number M1, corresponds to the "second condition" of the present disclosure.

Then, in the third embodiment, if the nozzle information, which is stored in the memory 102, indicates that the number M of the recoverable nozzles of the plurality of nozzles 10 of the ink-jet head 4 is not less than the predetermined number M1 (S401: YES), the routine advances to the process of S202. Further, if the nozzle information, which is stored in the memory 102, indicates that the number M of the recoverable nozzles of the plurality of nozzles 10 of the ink-jet head 4 is less than the predetermined number M1 (S401: NO), the routine advances to the process of S203.

Technical Effect of Third Embodiment

In the third embodiment, the unrecoverable nozzles, which are included in the abnormal nozzles, have the low possibility to be recovered thereafter (have the high possibility to be maintained in the states of the abnormal nozzles), and the recoverable nozzles have the high possibility to be recovered thereafter. On this account, when the number of the recoverable nozzles is small, the necessity is low for the external apparatus 100 to acquire the nozzle information from the printer 1 as compared with when the number of the recoverable nozzles is large. In view of the above, in the third embodiment, the first condition is such a condition that the nozzle information, which is stored in the memory 102 of the external apparatus 100, indicates that the number M of the recoverable nozzles is not less than the predetermined number M1. Further, the second condition is such a condition that the nozzle information, which is stored in the memory 102 of the external apparatus 100, indicates that the number M of the recoverable nozzles is less than the predetermined number M1. Then, when the second condition is fulfilled, the frequency to acquire the nozzle information is lowered as compared with when the first condition is fulfilled. Accordingly, the external apparatus 100 can be allowed to acquire the nozzle information from the printer 1 at the frequency corresponding to the necessity. As a result, it is possible to maximally lower the frequency at which the timing for the external apparatus 100 to acquire the nozzle information from the printer 1 is overlapped with the timing for the printer 1 to perform the recording on the recording paper P.

Fourth Embodiment

Next, a fourth embodiment of the present disclosure will be explained. The fourth embodiment also relates to the printer 1 and the external apparatus 100 in the same manner as the first to third embodiments. Further, also in the fourth embodiment, the controller 80 of the printer 1 performs the process in accordance with the flow depicted in FIG. 5A.

Figure 7:
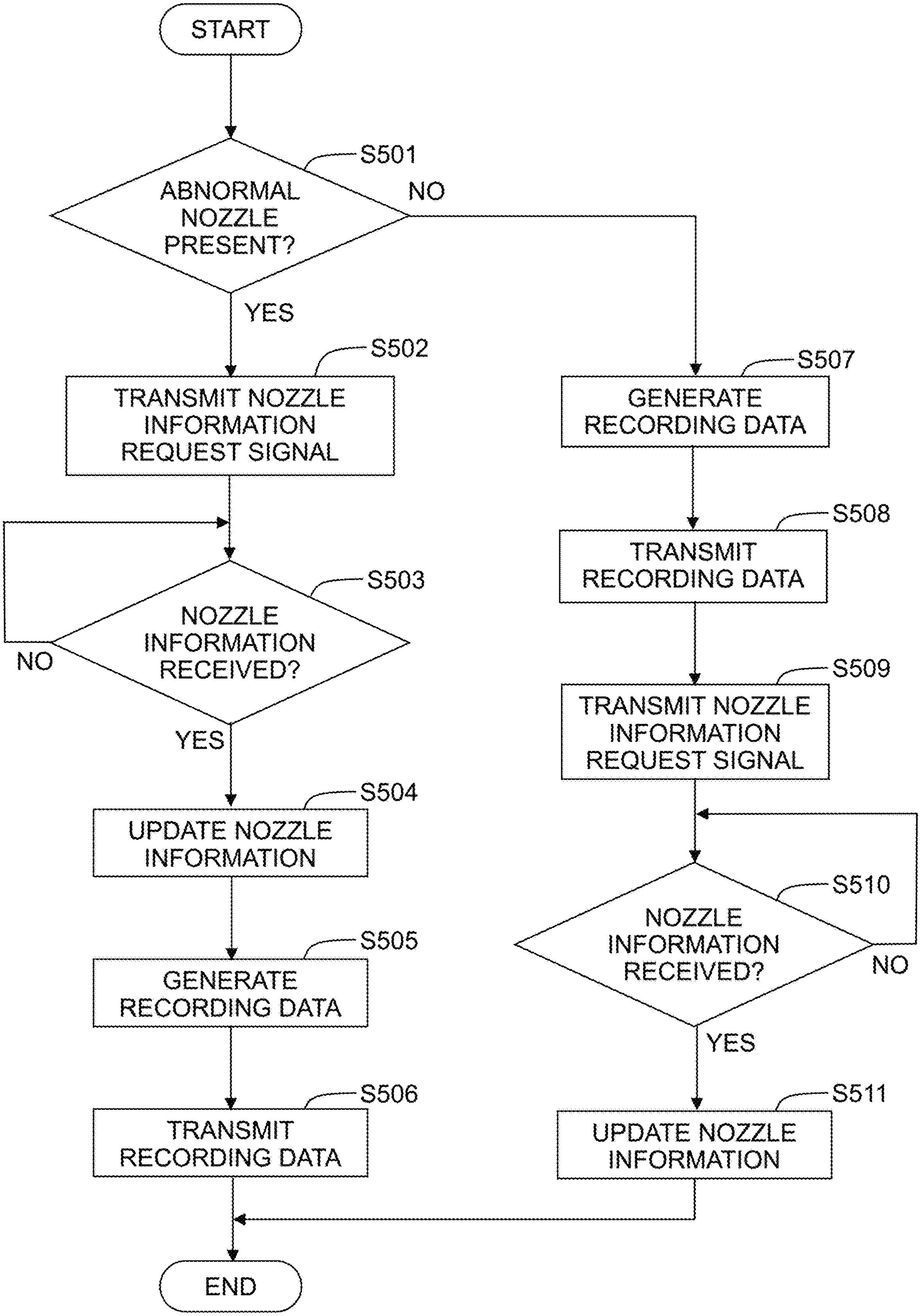
FIG. 7 is a flow chart illustrative of a flow of the process in an external apparatus when the electric power is supplied to the external apparatus.

On the other hand, in the fourth embodiment, if the recording command to instruct the printer 1 to perform the recording on the recording paper P is received, the controller 101 of the external apparatus 100 performs the process in accordance with the flow depicted in FIG. 7. For example, when the operation is performed in the external apparatus 100 by the user in order to perform the recording on the recording paper P, the controller 101 of the external apparatus 100 receives the recording command.

The flow depicted in FIG. 7 will be explained in detail below. The controller 101 of the external apparatus 100 judges whether or not the nozzle information, which is stored in the memory 102, indicates that the abnormal nozzle is present in the plurality of nozzles 10 of the ink-jet head 4 (S501, "judging process" of the present disclosure). Note that also in the fourth embodiment, the nozzle information is also the information which relates to whether or not each of the plurality of nozzles 10 of the ink-jet head 4 is the abnormal nozzle. Then, in the same manner as explained in the first embodiment, the nozzle information includes the information which relates to whether or not the abnormal nozzle is present in the plurality of nozzles 10 of the ink-jet head 4. Further, in the fourth embodiment, the condition, in which the nozzle information indicates that the abnormal nozzle is present in the plurality of nozzles 10 of the ink-jet head 4, corresponds to the "first condition" of the present disclosure. The condition, in which the nozzle information indicates that the abnormal nozzle is absent in the plurality of nozzles 10 of the ink-jet head 4, corresponds to the "second condition" of the present disclosure.

If the nozzle information, which is stored in the memory 102, indicates that the abnormal nozzle is present in the plurality of nozzles 10 of the ink-jet head 4 (S501: YES), the controller 101 of the external apparatus 100 transmits the nozzle information request signal to the printer 1 (S502). After that, the controller 101 of the external apparatus 100 waits until the nozzle information is received from the printer 1 (S503: NO). If the nozzle information is received from the printer 1 (S503: YES), the nozzle information, which is stored in the memory 102, is updated to the received nozzle information (S504).

Subsequently, the controller 101 of the external apparatus 100 generates the recording data in order to allow the printer 1 to record the image corresponding to the image data on the basis of the nozzle information and the image data of the image to be recorded, the image data being stored in the memory 102 (S505, "generating process" of the present disclosure). The generated recording data is transmitted to the printer 1 (S506, "transmitting process" of the present disclosure). The recording data includes the data which is provided to allow the ink-jet head 4 to eject the inks from the plurality of nozzles 10 in the recording pass as described later on, and the data which indicates the conveyance amount of the recording paper P in the conveyance action as described later on.

If the nozzle information, which is stored in the memory 102, indicates that the abnormal nozzle is absent in the plurality of nozzles 10 of the ink-jet head 4 (S501: NO), then the controller 101 of the external apparatus 100 generates the recording data on the basis of the image data (S507), and the generated recording data is transmitted to the printer 1 (S508). Subsequently, the controller 101 of the external apparatus 100 transmits the nozzle information request signal to the printer 1 (S509). After that, the controller 101 of the external apparatus 100 waits until the nozzle information is received from the printer 1 (S510: NO). If the nozzle information is received from the printer 1 (S510: YES), then the nozzle information, which is stored in the memory 102, is updated to the received nozzle information (S511), and the process is terminated.

Figure 8A:
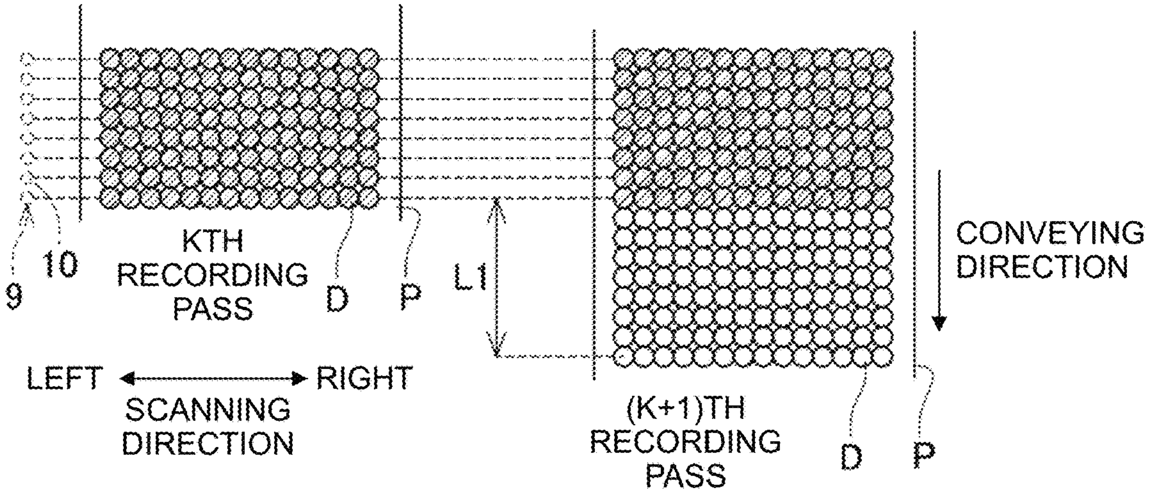
FIG. 8A is a drawing to explain generation of the recording data when the abnormal nozzle is absent.

An explanation will now be made briefly about the recording data generated in the processes of S505 and S507. For example, in the process of S507, each of the plurality of nozzles 10 for forming the nozzle array 9 is allotted to any one of the dots D formed in each of the recording passes as depicted in FIG. 8A in the Kth recording pass and the (K+1)th recording pass. Further, the conveyance amount of the recording paper P, which is provided in the conveyance action between the Kth recording pass and the (K+1)th recording pass, is set to the conveyance amount L1 corresponding to the length of the nozzle array 9 in the conveying direction.

Figure 8B:
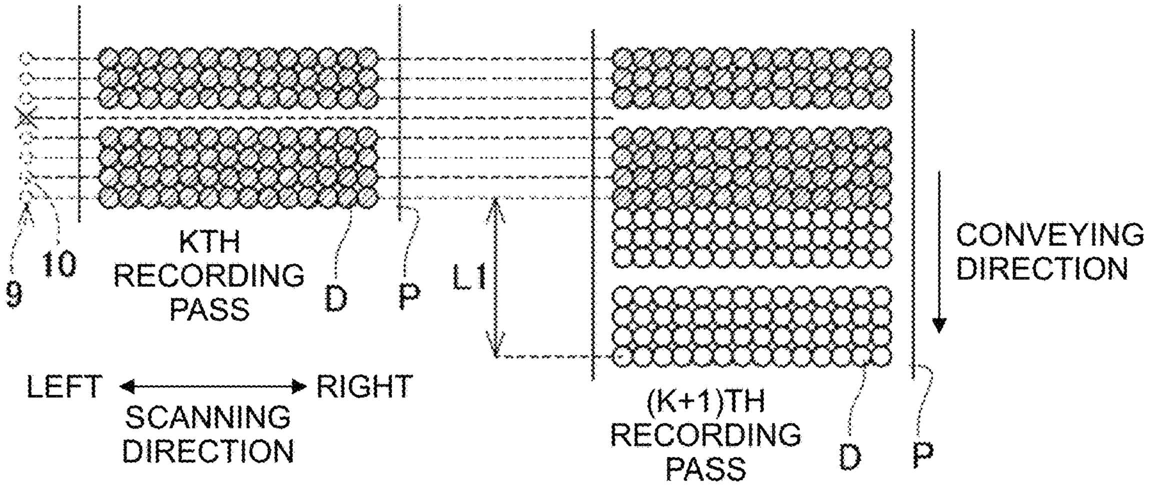
FIG. 8B is a drawing to explain a case in which the recording data is generated when the abnormal nozzle is present in the same manner as when the abnormal nozzle is absent.
Figure 8C:
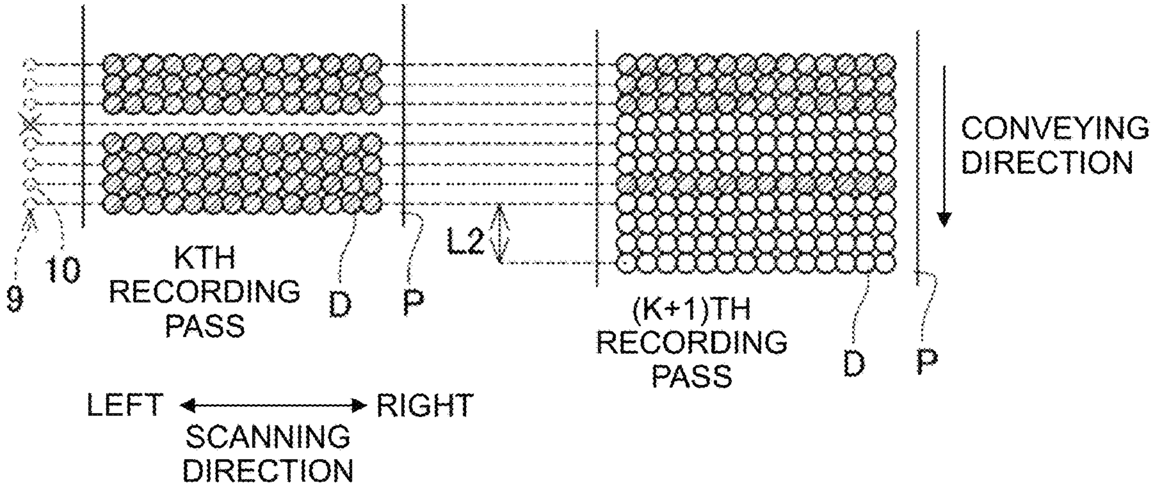
FIG. 8C is a drawing to explain generation of the recording data when the abnormal nozzle is present.

Note that in the drawings to show the Kth recording passes in FIGS. 8A to 8C, the hatched dots D indicate the dots D formed in the Kth recording pass. Further, in the drawings to show the (K+1)th recording passes in FIGS. 8A to 8C, the hatched dots D indicate the dots D formed in the (K+1)th recording pass, and the unhatched dots D indicate the dots D formed in the Kth recording pass.

On the other hand, if the abnormal nozzle is present, the dots D corresponding to the abnormal nozzle are not recorded as depicted in FIG. 8B, if each of the plurality of nozzles 10 for forming the nozzle array 9 is allotted to any one of the dots D formed in each of the recording passes in the Kth recording pass and the (K+1)th recording pass in the same manner as S507, and the conveyance amount of the recording paper P, which is provided in the conveyance action between the Kth recording pass and the (K+1)th recording pass, is set to L1. Note that, the nozzles 10, which are affixed with cross marks in FIGS. 8B and 8C, are the abnormal nozzles.

In view of the above, in S505, for example, as depicted in FIG. 8C, only the nozzle 10, which is not the abnormal nozzle and which is included in the plurality of nozzles 10 for forming the nozzle arrays 9 in the Kth recording pass and the (K+1)th recording pass, is allotted to the dot D to be formed in each of the recording passes. Further, the conveyance amount of the recording paper P, which is provided in the conveyance action between the Kth recording pass and the (K+1)th recording pass, is set to L2 which is shorter than the conveyance amount L1.

In this way, if the abnormal nozzle is present, the recording data is generated, wherein the dots D, which correspond to the abnormal nozzle when each of the plurality of nozzles 10 for forming the nozzle array 9 as depicted in FIG. 8B is allotted to any one of the dots D, are complemented so that the dots D are formed by ejecting the ink from the distinct nozzle 10. Note that the allotment of the nozzle 10 to the dots D as depicted in FIGS. 8A to 8C and the conveyance amount of the recording paper P in the conveyance action are described by way of example. The present disclosure is not limited thereto.

Technical Effect of Fourth Embodiment

In the fourth embodiment, the necessity for the external apparatus 100 to acquire the nozzle information from the printer 1 is low when the abnormal nozzle is absent as compared with when the abnormal nozzle is present. In view of the above, in the fourth embodiment, the first condition is such a condition that the nozzle information, which is stored in the memory 102 of the external apparatus 100, indicates that the abnormal nozzle is present. Further, the second condition is such a condition that the nozzle information, which is stored in the memory 102 of the external apparatus 100, indicates that the abnormal nozzle is absent. Then, if the first condition is fulfilled, the controller 101 of the external apparatus 100 acquires the nozzle information from the printer 1 before transmitting the recording data to the printer 1. Further, if the second condition is fulfilled, the controller 101 of the external apparatus 100 acquires the nozzle information from the printer 1 after transmitting the recording data to the printer 1. Accordingly, the nozzle information is acquired from the printer 1 before transmitting the recording data to the printer 1 only when the necessity to acquire the nozzle information is high. It is possible to maximally avoid such a situation that any delay arises in the recording on the recording paper P in the printer 1 on account of the acquisition of the nozzle information.

Further, in the fourth embodiment, if the first condition is fulfilled, the recording data is generated on the basis of the acquired nozzle information. Further, in this situation, the recording data is generated such that the dot D, which corresponds to the abnormal nozzle, is complemented so that the dot D is formed by ejecting the ink from the nozzle 10 which is not the abnormal nozzle. Accordingly, when the recording is performed on the recording paper P in the printer 1, even if the abnormal nozzle is present, then the dot can be formed equivalently to the situation in which the abnormal nozzle is absent.

Fifth Embodiment

Figure 9A:
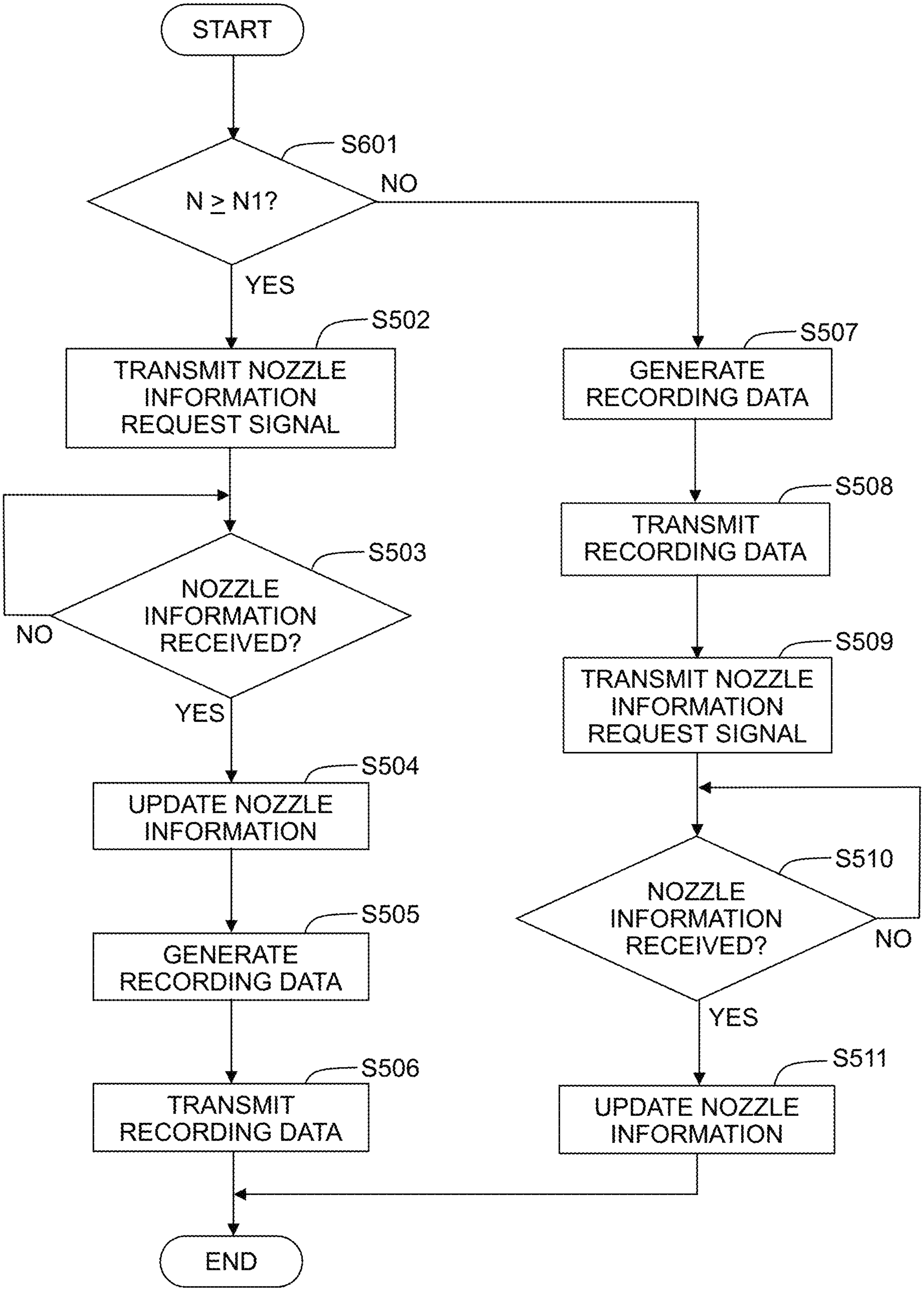
FIG. 9A is a flow chart illustrative of a flow of the process in an external apparatus when the electric power is supplied to the external apparatus.

Next, a fifth embodiment of the present disclosure will be explained. The fifth embodiment also relates to the printer 1 and the external apparatus 100 in the same manner as the first to fourth embodiments. Also in the fifth embodiment, the controller 80 of the printer 1 performs the process in accordance with the flow depicted in FIG. 5A. On the other hand, in the fifth embodiment, the controller 101 of the external apparatus 100 performs the process in accordance with the flow depicted in FIG. 9A. In the flow depicted in FIG. 9A, the process of S501 in the flow depicted in FIG. 7 is replaced with the process of S601.

In the process of S601, the controller 101 of the external apparatus 100 judges whether or not the nozzle information, which is stored in the memory 102, indicates that the number N of the abnormal nozzles of the plurality of nozzles 10 of the ink-jet head 4 is not less than a predetermined number N1 ("judging process" of the present disclosure). Note that also in the fifth embodiment, the nozzle information is the information which relates to whether or not each of the plurality of nozzles 10 of the ink-jet head 4 is the abnormal nozzle. Then, the nozzle information includes the information relevant to the number of the abnormal nozzles of the plurality of nozzles 10 of the ink-jet head 4 in the same manner as explained in the second embodiment. Further, in the fifth embodiment, the condition, in which the nozzle information stored in the memory 102 indicates that the number N of the abnormal nozzles of the plurality of nozzles 10 of the ink-jet head 4 is not less than the predetermined number N1, corresponds to the "first condition" of the present disclosure. Further, in the fifth embodiment, the condition, in which the nozzle information stored in the memory 102 indicates that the number N of the abnormal nozzles of the plurality of nozzles 10 of the ink-jet head 4 is less than the predetermined number N1, corresponds to the "second condition" of the present disclosure.

Then, in the fifth embodiment, if the nozzle information, which is stored in the memory 102, indicates that the number N of the abnormal nozzles of the plurality of nozzles 10 of the ink-jet head 4 is not less than the predetermined number N1 (S601: YES), the controller 101 of the external apparatus 100 executes the processes of S502 to S506. Further, if the nozzle information, which is stored in the memory 102, indicates that the number N of the abnormal nozzles of the plurality of nozzles 10 of the ink-jet head 4 is less than the predetermined number N1 (S601: NO), the controller 101 of the external apparatus 100 executes the processes of S507 to S511.

Technical Effect of Fifth Embodiment

In the fifth embodiment, if the number of the abnormal nozzles is small, the necessity for the external apparatus 100 to acquire the nozzle information from the printer 1 is low as compared with if the number of the abnormal nozzles is large. In view of the above, in the fifth embodiment, the first condition is such a condition that the nozzle information, which is stored in the memory 102 of the external apparatus 100, indicates that the number N of the abnormal nozzles is not less than the predetermined number N1. Further, the second condition is such a condition that the nozzle information, which is stored in the memory 102 of the external apparatus 100, indicates that the number N of the abnormal nozzles is less than the predetermined number N1. Then, if the first condition is fulfilled, the controller 101 of the external apparatus 100 acquires the nozzle information from the printer 1 before transmitting the recording data to the printer 1. Further, if the second condition is fulfilled, the controller of the external apparatus 100 acquires the nozzle information from the printer 1 after transmitting the recording data to the printer 1. Accordingly, the nozzle information is acquired from the printer 1 before transmitting the recording data to the printer 1 only when the necessity to acquire the nozzle information is high. It is possible to maximally avoid such a situation that any delay arises in the recording on the recording paper P in the printer 1 on account of the acquisition of the nozzle information.

Sixth Embodiment

Next, a sixth embodiment of the present disclosure will be explained. The sixth embodiment also relates to the printer 1 and the external apparatus 100 in the same manner as the first to fifth embodiments. In the sixth embodiment, in the same manner as the third embodiment, the nozzle information includes the information which relates to whether or not each of the plurality of nozzles 10 of the ink-jet head 4 is the abnormal nozzle and the information which relates to whether or not each of the plurality of nozzles 10 of the ink-jet head 4 is the unrecoverable nozzle incapable of being recovered by the suction purge. Note that also in the sixth embodiment, in the same manner as explained in the third embodiment, the nozzle information includes the information which relates to the number of the abnormal nozzles of the plurality of nozzles 10 of the ink-jet head 4 and the information which relates to the number of the unrecoverable nozzles.

Also in the sixth embodiment, the controller 80 of the printer 1 performs the process in accordance with the flow depicted in FIG. 5A. However, in the sixth embodiment, in the same manner as the third embodiment, the information to indicate whether or not each of the plurality of nozzles 10 of the ink-jet head 4 is the abnormal nozzle and the information to indicate whether or not each of the plurality of nozzles 10 of the ink-jet head 4 is the unrecoverable nozzle are stored in the flash memory 84 in the inspection process of S105.

Figure 9B:
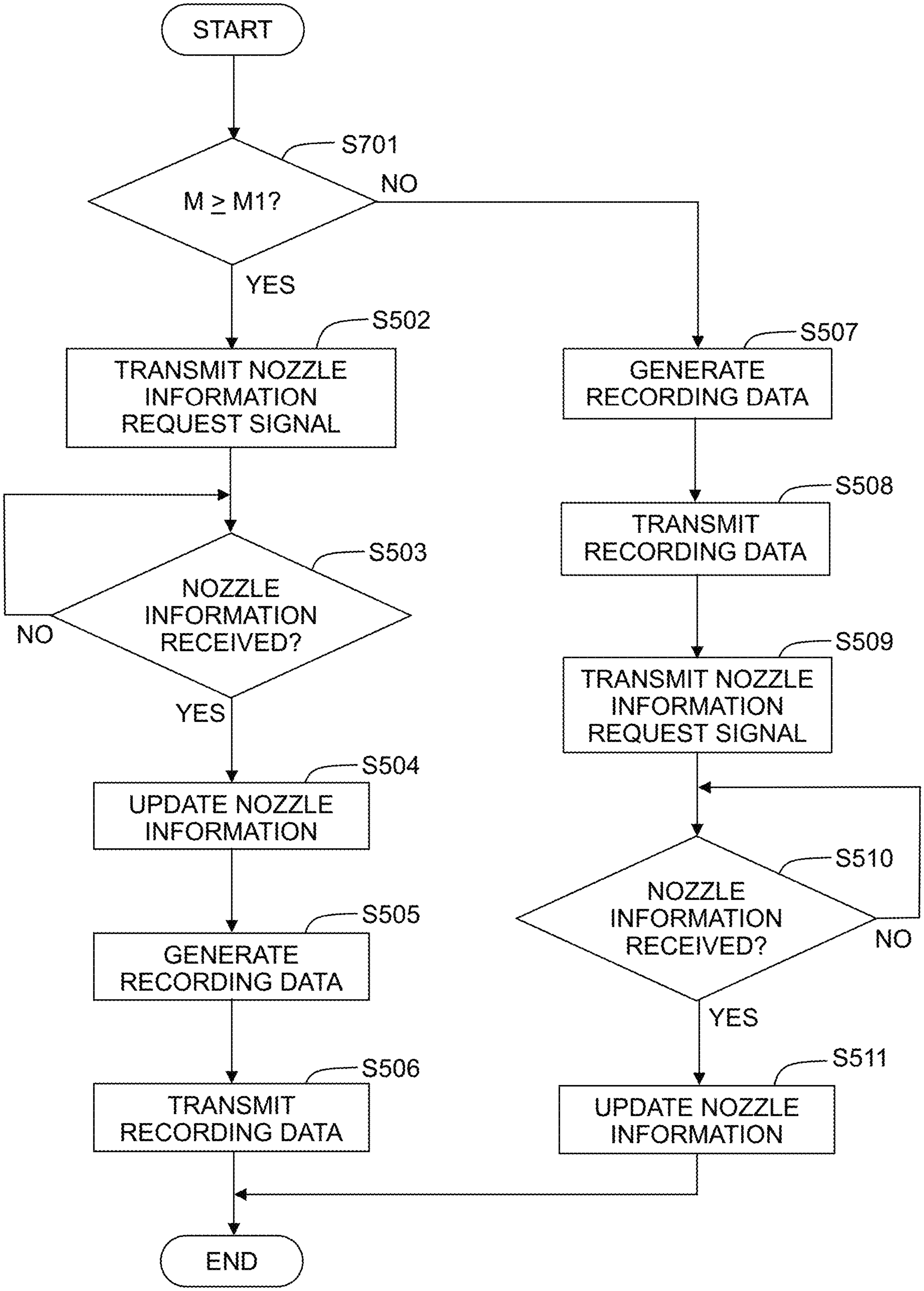
FIG. 9B is a flow chart illustrative of a flow of the process in an external apparatus when the electric power is supplied to the external apparatus.

Further, in the sixth embodiment, the controller 101 of the external apparatus 100 performs the process in accordance with the flow depicted in FIG. 9B. In the flow depicted in FIG. 9B, the process of S501 of the flow depicted in FIG. 7 is replaced with the process of S701.

In the process of S701, the controller 101 of the external apparatus 100 judges whether or not the nozzle information stored in the memory 102 indicates that the number M of the recoverable nozzles of the plurality of nozzles 10 of the ink-jet head 4 is not less than a predetermined number M1 ("judging process" of the present disclosure). Note that in the sixth embodiment, the condition, in which the nozzle information stored in the memory 102 indicates that the number M of the recoverable nozzles of the plurality of nozzles 10 of the ink-jet head 4 is not less than the predetermined number M1, corresponds to the "first condition" of the present disclosure. Further, in the sixth embodiment, the condition, in which the nozzle information stored in the memory 102 indicates that the number M of the recoverable nozzles of the plurality of nozzles 10 of the ink-jet head 4 is less than the predetermined number M1, corresponds to the “second condition” of the present disclosure.

Then, in the sixth embodiment, if the nozzle information, which is stored in the memory 102, indicates that the number M of the recoverable nozzles of the plurality of nozzles 10 of the ink-jet head 4 is not less than the predetermined number M1 (S701: YES), the controller 101 of the external apparatus 100 executes the processes of S502 to S506. Further, if the nozzle information, which is stored in the memory 102, indicates that the number M of the recoverable nozzles of the plurality of nozzles 10 of the ink-jet head 4 is less than the predetermined number M1 (S701: NO), the controller 101 of the external apparatus 100 executes the processes of S507 to S511.

Technical Effect of Sixth Embodiment

In the sixth embodiment, the unrecoverable nozzles, which are included in the abnormal nozzles, have the low possibility to be recovered thereafter (have the high possibility to be maintained in the states of the abnormal nozzles), and the recoverable nozzles have the high possibility to be recovered thereafter. On this account, when the number of the recoverable nozzles is small, the necessity is low for the external apparatus 100 to acquire the nozzle information from the printer 1 as compared with when the number of the recoverable nozzles is large.

In view of the above, in the sixth embodiment, the first condition is such a condition that the nozzle information, which is stored in the memory 102 of the external apparatus 100, indicates that the number M of the recoverable nozzles is not less than the predetermined number M1. Further, the second condition is such a condition that the nozzle information, which is stored in the memory 102 of the external apparatus 100, indicates that the number M of the recoverable nozzles is less than the predetermined number M1. Then, if the first condition is fulfilled, the controller 101 of the external apparatus 100 acquires the nozzle information from the printer 1 before transmitting the recording data to the printer 1. Further, if the second condition is fulfilled, the controller 101 of the external apparatus 100 acquires the nozzle information from the printer 1 after transmitting the recording data to the printer 1. Accordingly, the nozzle information is acquired from the printer 1 before transmitting the recording data to the printer 1 only when the necessity to acquire the nozzle information is high. It is possible to maximally avoid such a situation that any delay arises in the recording on the recording paper P in the printer 1 on account of the acquisition of the nozzle information.

Seventh Embodiment

Next, a seventh embodiment of the present disclosure will be explained. The seventh embodiment also relates to the printer 1 and the external apparatus 100 in the same manner as the first to sixth embodiments. In the seventh embodiment, as for the recording on the recording paper P with the printer 1, it is possible to selectively perform the monochrome recording in which a monochrome image is recorded on the recording paper P by ejecting the black ink from the plurality of nozzles 10 (“black nozzles” of the present disclosure) for forming the nozzle array 9 disposed on the rightmost side of the ink-jet head 4, and the color recording in which a color image is recorded on the recording paper P by ejecting the color inks from the plurality of nozzles 10 (“color nozzles” of the present disclosure) for forming the three nozzle arrays 9 disposed on the left side of the ink-jet head 4.

Also in the seventh embodiment, the controller 80 of the printer 1 performs the process in accordance with the flow depicted in FIG. 5A. In this procedure, in the recording process of S104, if the recording data, which is received from the external apparatus 100, corresponds to the monochrome recording, the black ink is ejected in the recording pass from the plurality of nozzles 10 for forming the nozzle array 9 disposed on the rightmost side of the ink-jet head 4. On the other hand, if the recording data, which is received from the external apparatus 100, corresponds to the color recording, the color inks are ejected in the recording pass from the plurality of nozzles 10 for forming the three nozzle arrays 9 disposed on the left side of the ink-jet head 4.

Figure 10:
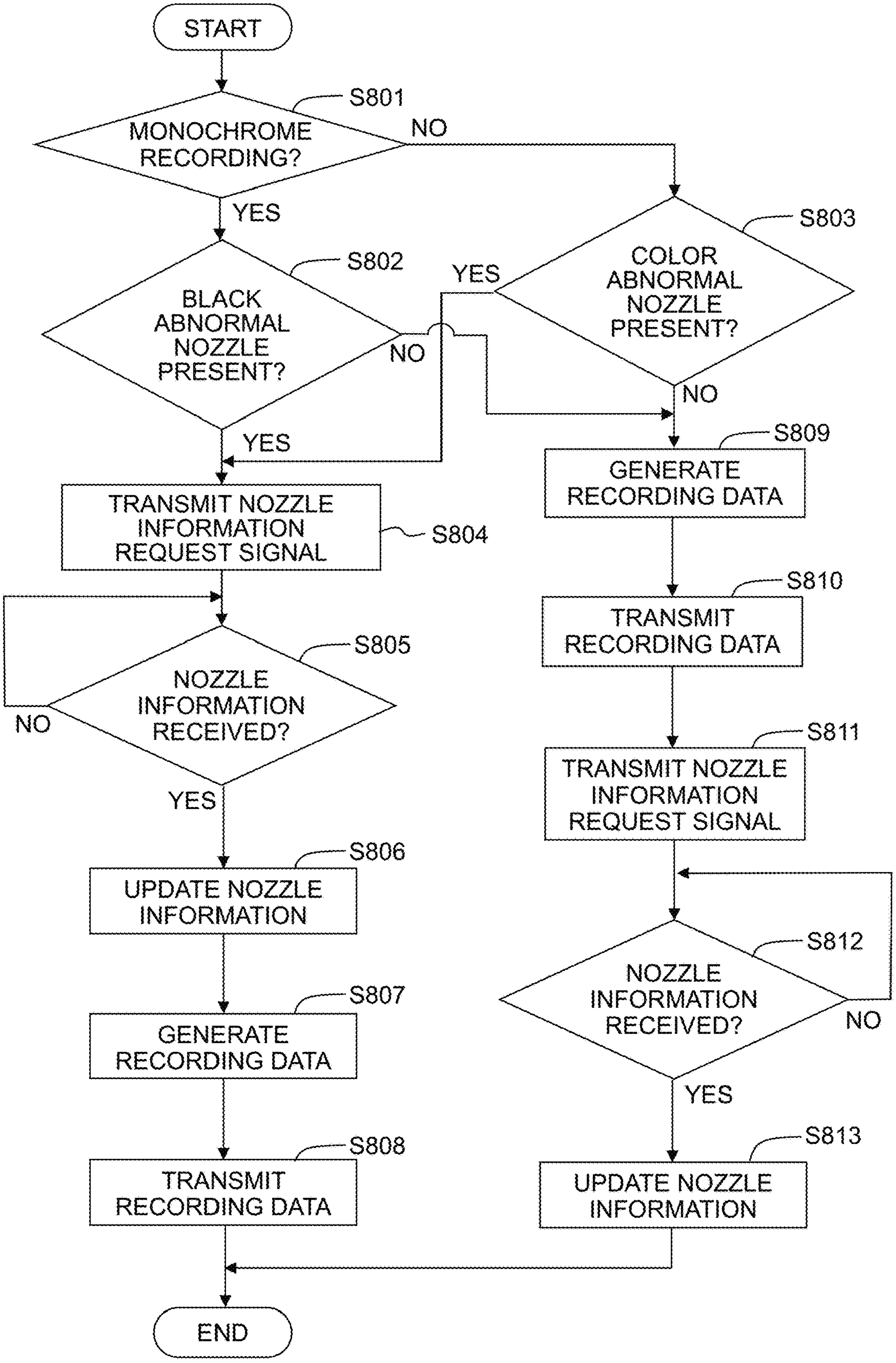
FIG. 10 is a flow chart illustrative of a flow of the process in an external apparatus when the electric power is supplied to the external apparatus.

Further, in the seventh embodiment, when the recording command is received, the controller 101 of the external apparatus 100 performs the process in accordance with the flow depicted in FIG. 10. In the seventh embodiment, the recording command includes the information to instruct the printer 1 to perform the recording in accordance with any one of the monochrome recording and the color recording.

The flow depicted in FIG. 10 will be explained in detail below. The controller 101 of the external apparatus 100 judges whether or not the recording command instructs the printer 1 to perform the monochrome recording (S801).

If the recording command instructs the printer 1 to perform the monochrome recording (S801: YES), the controller 101 of the external apparatus 100 judges whether or not the nozzle information, which is stored in the memory 102, indicates that the abnormal nozzle for ejecting the black ink is present in the plurality of nozzles 10 of the ink-jet head 4 (S802).

If the nozzle information, which is stored in the memory 102, indicates that the abnormal nozzle for ejecting the black ink is present in the plurality of nozzles 10 of the ink-jet head 4 (S802: YES), the controller 101 of the external apparatus 100 executes the processes of S804 to S808 in the same manner as the processes of S502 to S506 of the fourth embodiment.

If the nozzle information, which is stored in the memory 102, indicates that the abnormal nozzle for ejecting the black ink is absent in the plurality of nozzles 10 of the ink-jet head 4 (S802: NO), the controller 101 of the external apparatus 100 executes the processes of S809 to S813 in the same manner as the processes of S507 to S511 of the fourth embodiment.

On the other hand, if the recording command instructs the printer 1 to perform the color recording (S801: NO), the controller 101 of the external apparatus 100 judges whether or not the nozzle information, which is stored in the memory 102, indicates that the abnormal nozzle for ejecting the color ink is present in the plurality of nozzles 10 of the ink-jet head 4 (S803).

If the nozzle information, which is stored in the memory 102, indicates that the abnormal nozzle for ejecting the color ink is present in the plurality of nozzles 10 of the ink-jet head 4 (S803: YES), the controller 101 of the external apparatus 100 executes the processes of S804 to S808.

If the nozzle information, which is stored in the memory 102, indicates that the abnormal nozzle for ejecting the color ink is absent in the plurality of nozzles 10 of the ink-jet head 4 (S803: NO), the controller 101 of the external apparatus 100 executes the processes of S809 to S813.

Technical Effect of Seventh Embodiment

When the monochrome recording is performed, if the black nozzle changed to the abnormal nozzle is present, then the necessity is high for the controller 101 of the external apparatus 100 to acquire the nozzle information from the printer 1. Further, when the color recording is performed, if the color nozzle changed to the abnormal nozzle is present, then the necessity is high for the controller 101 of the external apparatus 100 to acquire the nozzle information from the printer 1. On the other hand, when the monochrome recording is performed, if the black nozzle changed to the abnormal nozzle is absent, then the necessity is low for the controller 101 of the external apparatus 100 to acquire the nozzle information from the printer 1. Further, when the color recording is performed, if the color nozzle changed to the abnormal nozzle is absent, then the necessity is low for the controller 101 of the external apparatus 100 to acquire the nozzle information from the printer 1.

In view of the above, in the seventh embodiment, the first condition resides in such a condition that the black nozzle provided to perform the monochrome recording and changed to the abnormal nozzle is present and such a condition that the color nozzle provided to perform the color recording and changed to the abnormal nozzle is present. Then, if the first condition is fulfilled, the controller 101 of the external apparatus 100 acquires the nozzle information from the printer 1 before transmitting the recording data to the printer 1. Further, if the second condition is fulfilled, the controller 101 of the external apparatus 100 acquires the nozzle information from the printer 1 after transmitting the recording data to the printer 1. Accordingly, only when the necessity is high to acquire the nozzle information, the nozzle information is acquired from the printer 1 before transmitting the recording data to the printer 1. When the monochrome recording and the color recording are performed in the printer 1 by acquiring the nozzle information, it is possible to maximally avoid such a situation that any delay arises in the recording on the recording paper P.

Eighth Embodiment

Next, an eighth embodiment of the present disclosure will be explained. The eighth embodiment also relates to the printer 1 and the external apparatus 100 in the same manner as the first to seventh embodiments. Also in the eighth embodiment, the controller 80 of the printer 1 performs the process in accordance with the flow depicted in FIG. 5A. On the other hand, in the eighth embodiment, the controller 101 of the external apparatus 100 performs the process in accordance with the flow depicted in FIG. 11.

Figure 11:
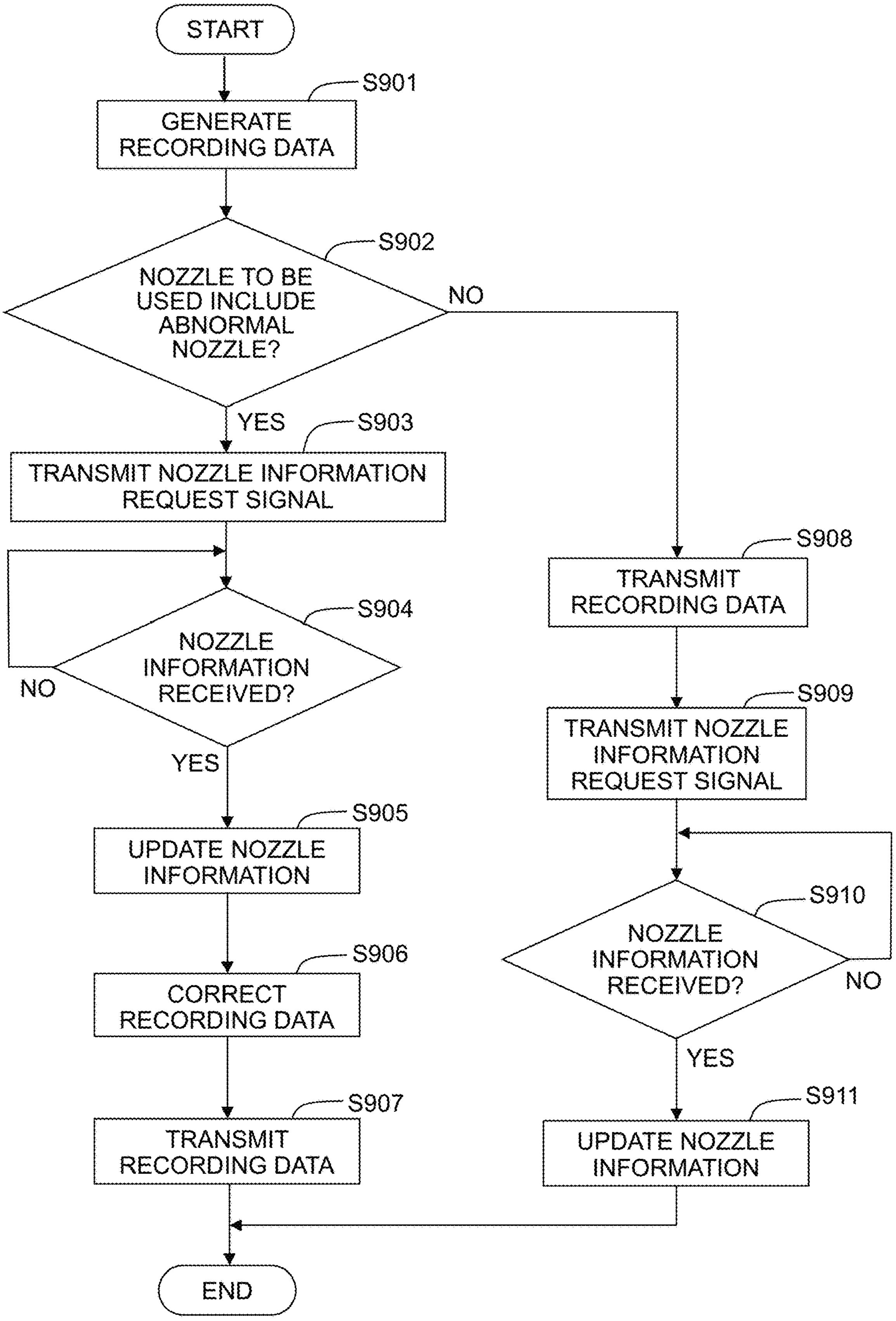
FIG. 11 is a flow chart illustrative of a flow of the process in an external apparatus when the electric power is supplied to the external apparatus.

The flow depicted in FIG. 11 will be explained in detail below. The controller 101 of the external apparatus 100 generates the recording data on the basis of the image data stored in the memory 102 (S901). In this procedure, the controller 101 of the external apparatus 100 does not refer to the nozzle information stored in the memory 102. Therefore, the recording data, which is generated in the process of S101, is the data in which the nozzles 10 are allotted to the dots D and the conveyance amount in the conveyance action is set, for example, as depicted in FIG. 8A or FIG. 8B.

Subsequently, the controller 101 of the external apparatus 100 judges whether or not the nozzles 10 to be used for the recording include the abnormal nozzle of the nozzle information stored in the memory 102 (S902) when the printer 1 is allowed to perform the recording on the recording paper P on the basis of the generated recording data, on the basis of the generated recording data and the nozzle information stored in the memory 102. Note that in the eighth embodiment, the condition, in which the nozzles 10 to be used for the recording include the abnormal nozzle of the nozzle information stored in the memory 102, corresponds to the "first condition" of the present disclosure. Further, the condition, in which the nozzles 10 to be used for the recording do not include the abnormal nozzle of the nozzle information stored in the memory 102, corresponds to the "second condition" of the present disclosure.

If the nozzles 10, which are to be used for the recording, include the abnormal nozzle of the nozzle information stored in the memory 102 (S902: YES), then the controller 101 of the external apparatus 100 transmits the nozzle information request signal to the printer 1 (S903), and then the controller 101 of the external apparatus 100 waits until the nozzle information is received from the printer 1 (S904: NO). Then, if the nozzle information is received from the printer 1 (S904: YES), the controller 101 of the external apparatus 100 updates the nozzle information stored in the memory 102 with the received nozzle information (S905). Subsequently, the controller 101 of the external apparatus 100 corrects the recording data generated in the process of S901 (S906, "correcting process" of the present disclosure) on the basis of the nozzle information after the update.

In the process of S906, the controller 101 of the external apparatus 100 corrects the recording data generated in S901 into such recording data that the dot D, which corresponds to the abnormal nozzle in the recording data, is complemented so that the dot D is formed by the ink ejected from any distinct nozzle 10 which is not the abnormal nozzle. For example, the recording data, in which the nozzle 10 is allotted to the dot D as depicted in FIG. 8B and the conveyance amount in the conveyance action is set, is corrected into the data in which the allotment of the nozzle 10 with respect to the dot D is updated as depicted in FIG. 8C and the conveyance amount in the conveyance action is changed. Subsequently, the controller 101 of the external apparatus 100 transmits the recording data after the correction in the process of S905 to the printer (S907), and the process is terminated.

If the nozzles 10, which are to be used for the recording, do not include the abnormal nozzle of the nozzle information stored in the memory 102 (S902: NO), the controller 101 of the external apparatus 100 transmits the recording data generated in the process of S901 to the printer 1 (S908). After that, the controller 101 of the external apparatus 100 transmits the nozzle information request signal to the printer 1 (S909), and then the controller 101 of the external apparatus 100 waits until the nozzle information is received from the printer 1 (S910: NO). Then, if the nozzle information is received from the printer 1 (S910: YES), then the nozzle information stored in the memory 102 is updated with the received nozzle information (S911), and the process is terminated.

Technical Effect of Eighth Embodiment

If the recording is performed with the printer 1 on the basis of the recording data generated on condition that the abnormal nozzle is absent, the nozzles 10 to be used for the recording may include the abnormal nozzle. In such a situation, in order to correct the recording data, it is necessary for the controller 101 of the external apparatus 100 to acquire the nozzle information from the printer 1 before transmitting the recording data to the printer 1. That is, the necessity is high for the controller 101 of the external apparatus 100 to acquire the nozzle information from the printer 1. On the other hand, even if the recording is performed with the printer 1 on the basis of the recording data generated on condition that the abnormal nozzle is absent, it is unnecessary to correct the recording data irrelevant to the presence or absence of the abnormal nozzle, if the nozzles 10 to be used for the recording do not include the abnormal nozzle. On this account, the necessity is low for the controller 101 of the external apparatus 100 to acquire the nozzle information from the printer 1.

In view of the above, in the eighth embodiment, the first condition is such a condition that the nozzles 10, which are to be used when the recording is performed with the printer 1 on the basis of the generated recording data, include the abnormal nozzle of the nozzle information. Further, the second condition is such a condition that the nozzles 10, which are to be used when the recording is performed with the printer 1 on the basis of the generated recording data, do not include the abnormal nozzle of the nozzle information. Then, if the first condition is fulfilled, the controller 101 of the external apparatus 100 acquires the nozzle information from the printer 1 before transmitting the recording data to the printer 1. Further, if the second condition is fulfilled, the controller 101 of the external apparatus 100 acquires the nozzle information from the printer 1 after transmitting the recording data to the printer 1. Accordingly, the nozzle information is acquired from the printer 1 before transmitting the recording data to the printer 1 only when the necessity is high to acquire the nozzle information. It is possible to maximally avoid such a situation that any delay arises in the recording on the recording paper P in the printer 1 on account of the acquisition of the nozzle information.

Further, in the eighth embodiment, the recording data is corrected on the basis of the nozzle information acquired by the controller 101 of the external apparatus 100. Further, in this situation, the recording data is corrected so that the dot D, which corresponds to the abnormal nozzle, is complemented so that the dot D is formed by ejecting the ink from the nozzle 10 which is not the abnormal nozzle. Accordingly, when the recording is performed on the recording paper P with the printer 1, even if the abnormal nozzle is present, then the dot can be formed in the same manner as if the abnormal nozzle is absent.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification

The first to eighth embodiments of the present disclosure have been explained above. However, the present disclosure is not limited to the first to eighth embodiments. It is possible to make various changes within a scope defined in claims.

For example, the first timing and the second timing in the first to third embodiments may be distinct timings such that the frequency of the second timing is lower than the frequency of the first timing. For example, the first timing may be a timing at which the number of sheets of the recording paper P subjected to the recording after the previous acquisition of the nozzle information arrives at a first number of sheets, and the second timing may be a timing at which the number of sheets of the recording paper P subjected to the recording after the previous acquisition of the nozzle information arrives at a second number of sheets which is larger than the first number of sheets.

Further, if the first condition, which is distinct from those explained in the first to third embodiments, is fulfilled, the external apparatus 100 may acquire the nozzle information from the printer 1 at the first timing. If the second condition, which is distinct from those explained in the first to third embodiments, is fulfilled, the external apparatus 100 may acquire the nozzle information from the printer 1 at the second timing having the frequency lower than that of the first timing.

In the first to third embodiments, the two conditions, i.e., the first condition and the second condition are set. The frequency for the external apparatus 100 to acquire the nozzle information from the printer 1 is changed depending on which condition of the two conditions is fulfilled. However, there is no limitation thereto. For example, it is also allowable to set three or more conditions. The frequency for the external apparatus 100 to acquire the nozzle information from the printer 1 may be changed depending on which condition of the three or more conditions is fulfilled.

Further, in the first to third embodiments, the nozzle information is the information which relates to whether or not each of the plurality of nozzles 10 of the ink-jet head 4 is the abnormal nozzle. However, there is no limitation thereto as well. For example, in the first embodiment, the nozzle information may be the information which indicates whether or not the abnormal nozzle is present in the plurality of nozzles 10 of the ink-jet head 4 itself. Further, for example, in the second embodiment, the nozzle information may be the information which indicates the number of the abnormal nozzles itself of the plurality of nozzles 10 of the ink-jet head 4. Further, for example, in the third embodiment, the nozzle information may be the information which indicates the number of the abnormal nozzles itself and the number of the unrecoverable nozzles itself of the plurality of nozzles 10 of the ink-jet head 4. Alternatively, for example, in the third embodiment, the nozzle information may be the information which indicates the number of the recoverable nozzles itself.

Further, in the fourth to seventh embodiments, when the first condition is fulfilled, then the controller 101 of the external apparatus 100 receives the nozzle information from the printer 1, and the nozzle information stored in the memory 102 is updated. After that, the recording data is generated to complement the dot corresponding to the abnormal nozzle so that the dot is formed by ejecting the ink from the distinct nozzle 10 which is not the abnormal nozzle on the basis of the image data and the nozzle information after the update irrelevant to, for example, the number of the abnormal nozzles and the distribution of the abnormal nozzles indicated by the nozzle information. However, there is no limitation thereto.

For example, when it is difficult to generate the recording data as described above on account of the condition including, for example, the number of the abnormal nozzles and the distribution of the abnormal nozzles indicated by the nozzle information after the update, if the recording data is generated as described above, then the number of times of the recording passes required for the recording of the image may be excessively increased. In such a situation, it is also allowable to generate the recording data after providing a state in which the abnormal nozzle is absent by performing the suction purge.

In the seventh embodiment, the color recording is performed by ejecting the inks from the plurality of nozzles 10 for forming the three nozzle arrays 9 disposed on the right side. Further, in conformity therewith, in the process of S803, it is judged whether or not the nozzle information indicates that the abnormal nozzle to eject the color ink is present in the plurality of nozzles 10 of the ink-jet head 4. However, there is no limitation thereto. In the seventh embodiment, the color recording may be performed by ejecting the black ink and the color inks from the plurality of nozzles 10 for forming the four nozzle arrays 9. Then, in conformity therewith, in the process of S803, it is also allowable to judge whether or not the nozzle information indicates that the abnormal nozzle is present in the plurality of nozzles 10 of the ink-jet head 4.

In the eighth embodiment, if the first condition is fulfilled, then the controller 101 of the external apparatus 100 receives the nozzle information from the printer 1, and the nozzle information stored in the memory 102 is updated. After that, the recording data generated in the process of S901 is corrected on the basis of the nozzle information after the update. However, the embodiment of the present disclosure is not limited thereto. For example, the controller 101 may abandon the image data generated in the process of S901. The controller 101 may generate the recording data again on the basis of the image data and the nozzle information after the update. In this case, the recording data may be generated in the same manner as explained in the fourth the seventh embodiments.

Further, in the eighth embodiment, if the first condition is fulfilled, then the controller 101 of the external apparatus 100 receives the nozzle information from the printer 1, and the nozzle information stored in the memory 102 is updated. After that, the controller 101 corrects the recording data to complement the dot corresponding to the abnormal nozzle so that the dot is formed by ejecting the ink from the distinct nozzle 10 which is not the abnormal nozzle, on the basis of the nozzle information after the update irrelevant to, for example, the number of the abnormal nozzles and the distribution of the abnormal nozzles indicated by the nozzle information. However, the present disclosure is not limited to the embodiment as described above. For example, when it is difficult to correct the recording data as described above on account of the condition including, for example, the number of the abnormal nozzles and the distribution of the abnormal nozzles indicated by the nozzle information after the update, if the recording data is corrected as described above, then the number of times of the recording passes required for the recording of the image may be excessively increased in some cases. In such a situation, it is also allowable to transmit the recording data to the printer 1 without correcting the recording data after providing a state in which the abnormal nozzle is absent by performing the suction purge.

Further, if the first condition, which is distinct from those explained in the fourth to eighth embodiments, is fulfilled, the recording data may be transmitted to the printer 1 after the controller 101 of the external apparatus 100 receives the nozzle information from the printer 1. If the second condition, which is distinct from those explained in the fourth to eighth embodiments, is fulfilled, the recording data may be transmitted to the printer 1 before the controller 101 of the external apparatus 100 receives the nozzle information from the printer 1. In this case, the nozzle information is not limited to the information which relates to whether or not each of the plurality of nozzles 10 of the ink-jet head 4 is the abnormal nozzle. The nozzle information may be any distinct information which makes it possible to judge whether or not the first condition is fulfilled and whether or not the second condition is fulfilled.

Further, in the third and sixth embodiments, the unrecoverable nozzle is the abnormal nozzle which is not recovered by the suction purge. However, there is no limitation thereto. For example, when any one of a plurality of types of suction purge, in which the force to discharge the ink from the abnormal nozzle differs, can be selectively performed in the printer, the abnormal nozzle, which cannot be recovered even by the suction purge having the strongest force to discharge the ink, may be designated as the unrecoverable nozzle.

Further, it is not necessarily indispensable that the abnormal nozzle should be recovered by the suction purge. For example, a pressurizing pump, which pressurizes the ink contained in the ink-jet head 4, may be provided, for example, in the flow passage between the ink cartridge 14 and the ink-jet head 4. Then, the pressurizing purge, in which the ink contained in the ink-jet head 4 is discharged by driving the pressurizing pump in a state in which the plurality of nozzles 10 is covered with the cap 71, may be performed as the purge. Note that in this case, the pressurizing purge corresponds to the “recovery action” of the present disclosure, and the cap 71 and the pressurizing pump constitute the “recovery mechanism” of the present disclosure.

Alternatively, both of the suction purge based on the driving of the suction pump 72 and the pressurizing purge based on the driving of the pressurizing pump described above may be performed. Note that in this case, the suction purge and the pressurizing purge correspond to the “recovery action” of the present disclosure, and the maintenance unit 8 and the pressurizing pump constitute the “recovery mechanism” of the present disclosure.

Further, the present disclosure is not limited to the recovery of the abnormal nozzle by means of the purge. For example, the ink-jet head 4 may be allowed to perform the flashing in which the ink is discharged from the abnormal nozzle so that the abnormal nozzle is recovered thereby. Note that in this case, the flashing corresponds to the “recovery action” of the present disclosure, and the ink-jet head 4 also serves as the “recovery mechanism” of the present disclosure.

Further, in the exemplary case described above, it is judged whether or not the nozzle 10 is the abnormal nozzle on the basis of the signal outputted from the signal processing circuit 78 in accordance with the change of the voltage of the electrode 76 arranged in the cap 71 as directed from the nozzle 10 when the ink-jet head 4 is allowed to perform the driving for inspection. However, there is no limitation thereto.

For example, an electrode, which extends in the vertical direction and which is opposed to the space disposed under or below the nozzle 10 in a state in which the carriage 2 is positioned at the maintenance position, may be provided in place of the electrode 76. Then, it is also allowable to output a signal from the signal processing circuit 78 in accordance with the change of the voltage of the foregoing electrode when the driving for inspection is performed in the state in which the carriage 2 is positioned at the maintenance position.

Alternatively, for example, it is also allowable to provide an optical sensor which directly detects the ink ejected from the nozzle 10 in a state in which the carriage 2 is positioned at a predetermined position such as the maintenance position or the like so that a signal is outputted in accordance with a detection result. Then, it is also allowable to judge whether or not the nozzle 10 is the abnormal nozzle on the basis of the signal outputted from the optical sensor.

Alternatively, for example, a voltage detection circuit, which detects the change of the voltage when the ink is ejected from the nozzle, may be connected to a plate on which the nozzle of the ink-jet head is formed, and it is also allowable to judge whether or not the nozzle is the abnormal nozzle on the basis of a signal outputted from the voltage detection circuit when the action is performed to eject the ink from the nozzle in a state in which the carriage is moved to an inspection position.

Alternatively, for example, the substrate of the ink-jet head may be provided with a temperature detecting element. Then, a heater is driven by applying a first applied voltage in order to eject the ink, and then the heater is driven by applying a second applied voltage so that the ink is not ejected. A signal, which depends on whether or not the nozzle 10 is the abnormal nozzle, may be outputted on the basis of the change of the temperature detected by the temperature detecting element during the period until a predetermined time thereafter elapses after applying the second applied voltage.

Alternatively, a predetermined test pattern may be recorded by the printer, and it is also allowable to judge whether or not each of the nozzles 10 is the abnormal nozzle on the basis of a recording result of the test pattern. In this procedure, when the printer is a multifunction machine provided with a scanner, it is also allowable to input the recording result of the test pattern by allowing the scanner to read the test pattern. Alternatively, it is also allowable to input the recording result of the test pattern by operating the operation unit 68 and the external apparatus by the user on the basis of the recording result of the test pattern.

Further, in the exemplary case described above, it is judged whether or not the nozzle 10 is the abnormal nozzle by performing the driving for inspection in relation to all of the nozzles 10 of the ink-jet head 4. However, there is no limitation thereto. For example, it is also allowable to judge whether or not the nozzle 10 is the abnormal nozzle by performing the driving for inspection in relation to only some of the nozzles 10 of the ink-jet head 4, for example, in relation to the alternate nozzles 10 included in each of the nozzle arrays 9. Then, as for the other nozzles 10, it is also allowable to estimate whether or not the nozzle 10 is the abnormal nozzle on the basis of the judgment result in relation to the some of the nozzles 10 described above.

Further, in the exemplary case described above, it is judged whether or not the nozzle 10 is the abnormal nozzle on the basis of whether or not the ink is ejected from the nozzle 10. However, there is no limitation thereto. For example, it is also allowable to judge whether or not the nozzle 10 is the abnormal nozzle on the basis of, for example, the ejecting direction and/or the ejecting speed of the ink.

Further, in the foregoing description, such an example has been explained that the present disclosure is applied to the external apparatus capable of communicating with the printer provided with the so-called serial head in which the inks are ejected from the plurality of nozzles while moving in the scanning direction together with the carriage. However, there is no limitation thereto. For example, it is also possible to apply the present disclosure to an external apparatus capable of communicating with a printer provided with a so-called line head which extends over the entire length of the recording paper in the scanning direction.

Further, in the foregoing description, such an example has been explained that the present disclosure is applied to the external apparatus capable of communicating with the printer which performs the recording on the recording paper P by ejecting the inks from the nozzles. However, there is no limitation thereto. The present disclosure is also applicable to an external apparatus capable of communicating with a printer which records an image on any recording objective medium other than the recording paper, including, for example, T-shirts, sheets for outdoor advertisement, cases for mobile terminals such as smartphones or the like, corrugated cardboards, and resin members. Further, the present disclosure is also applicable to an external apparatus capable of communicating with a liquid ejecting apparatus for ejecting any liquid other than the ink, including, for example, resin or metal in a liquid state.

What is claimed is:

1. A non-transitory computer readable medium recorded with a program for controlling an external apparatus including a memory and being configured to communicate with a liquid ejecting apparatus including a head having a plurality of nozzles wherein the program allows a computer to execute:

acquiring nozzle information to indicate states of the plurality of nozzles from the liquid ejecting apparatus so that the nozzle information is stored in the memory;

acquiring the nozzle information at a first timing at which an elapsed time T is longer than a first time T1 in a case that the nozzle information stored in the memory fulfills a first condition, the elapsed time T being a time elapsed after receiving the nozzle information previously; and acquiring the nozzle information at a second timing at which an elapsed time T is longer than a second time T2(T2>T1) in a case that the nozzle information stored in the memory fulfills a second condition being different from the first condition, a frequency of the second timing is lower than the frequency of the first timing.

2. The non-transitory computer readable medium according to claim 1, wherein the nozzle information includes information relating to whether or not an abnormal nozzle, which involves abnormality to eject the liquid, is present in the plurality of nozzles of the head, the first condition is a condition that the nozzle information stored in the memory indicates that the abnormal nozzle is present in the plurality of nozzles of the head, and the second condition is a condition that the nozzle information stored in the memory indicates that the abnormal nozzle is absent in the plurality of nozzles of the head.

3. The non-transitory computer readable medium according to claim 1, wherein the nozzle information includes information relating to the number of abnormal nozzles having abnormality to eject the liquid of the plurality of nozzles of the head, the first condition is a condition that the nozzle information stored in the memory indicates that the number of abnormal nozzles is not less than a predetermined number, and the second condition is a condition that the nozzle information stored in the memory indicates that the number of abnormal nozzles is less than the predetermined number.

4. The non-transitory computer readable medium according to claim 1, wherein the liquid ejecting apparatus includes a recovery mechanism configured to perform a recovery action to recover abnormal nozzles in the plurality of the nozzles, the nozzle information includes information relating to the number of abnormal nozzles having abnormality to eject the liquid of the plurality of nozzles of the head and the number of unrecoverable nozzles which are the abnormal nozzles incapable of being recovered by the recovery action, the first condition is a condition that the nozzle information stored in the memory indicates that a number, which is obtained by subtracting the number of unrecoverable nozzles from the number of abnormal nozzles, is not less than a predetermined number, and the second condition is a condition that the nozzle information stored in the memory indicates that the number, which is obtained by subtracting the number of unrecoverable nozzles from the number of abnormal nozzles, is less than the predetermined number.

* * * * *